US012413890B2

(12) United States Patent
Boothe et al.

(10) Patent No.: US 12,413,890 B2
(45) Date of Patent: Sep. 9, 2025

(54) DUAL-SPEAKER SYSTEM

(71) Applicant: Apple Inc., Cupertino, CA (US)

(72) Inventors: Daniel K. Boothe, San Francisco, CA (US); Martin E. Johnson, Los Gatos, CA (US); David Sumberg, San Francisco, CA (US); David A. Kalinowski, Davis, CA (US); Peter V. Jupin, Copenhagen (DK)

(73) Assignee: Apple Inc., Cupertino, CA (US)

( * ) Notice: Subject to any disclaimer, the term of this patent is extended or adjusted under 35 U.S.C. 154(b) by 193 days.

(21) Appl. No.: 18/188,191

(22) Filed: Mar. 22, 2023

(65) Prior Publication Data

US 2023/0292032 A1 Sep. 14, 2023

Related U.S. Application Data

(63) Continuation of application No. PCT/US2021/051922, filed on Sep. 24, 2021.

(60) Provisional application No. 63/083,760, filed on Sep. 25, 2020.

(51) Int. Cl.
*H04R 29/00* (2006.01)
*H04R 1/10* (2006.01)
*H04R 1/32* (2006.01)

(52) U.S. Cl.
CPC ........... *H04R 1/1041* (2013.01); *H04R 1/323* (2013.01)

(58) Field of Classification Search
CPC .............................. H04R 1/1041; H04R 1/323
See application file for complete search history.

(56) References Cited

U.S. PATENT DOCUMENTS

| | | | | |
|---|---|---|---|---|
| 6,219,426 | B1 * | 4/2001 | Daniels | H04R 5/02 381/17 |
| 8,525,868 | B2 | 9/2013 | Forutanpour et al. | |
| 11,146,892 | B1 * | 10/2021 | Merewether | G01V 3/081 |
| 2014/0064526 | A1 | 3/2014 | Otto et al. | |
| 2015/0194144 | A1 | 7/2015 | Park et al. | |
| 2015/0281830 | A1 | 10/2015 | Gauger, Jr. et al. | |
| 2017/0353796 | A1 | 12/2017 | Jeffery et al. | |
| 2019/0020940 | A1 * | 1/2019 | Silver | H04R 1/1008 |

(Continued)

FOREIGN PATENT DOCUMENTS

| | | |
|---|---|---|
| JP | S5326133 | 3/1978 |
| WO | 2018022824 A1 | 2/2018 |

OTHER PUBLICATIONS

CNET, Dan Graziano, "Oakley Radar Pace review: Smart sunglasses are actually a great coach", received from https://www.cnet.com/reviews/oakley-radar-pace-review/, Dec. 5, 2016, 9 pages.

(Continued)

*Primary Examiner* — Simon King
(74) *Attorney, Agent, or Firm* — Aikin & Gallant, LLP

(57) ABSTRACT

An output device that includes a housing, a first speaker driver that is integrated within the housing at a first location and is arranged to project sound into an ambient environment in a first direction, and a second speaker driver that is integrated within the housing at a second location that is different than the first location and is arranged to project sound into the ambient environment, where the first and second speaker drivers are integrated within the housing and share a common back volume within the housing.

17 Claims, 11 Drawing Sheets

(56) References Cited

U.S. PATENT DOCUMENTS

| | | | | |
|---|---|---|---|---|
| 2019/0253805 | A1 | 8/2019 | Wakeland et al. | |
| 2020/0112778 | A1* | 4/2020 | Rainer ................. | H04R 1/2896 |

OTHER PUBLICATIONS

PCT/US2021/051922, "PCT Written Opinion of the International Searching Authority and International Search Report", mailed Mar. 31, 2022, 17 pages.

* cited by examiner

DUAL-SPEAKER SYSTEM

FIELD

An aspect of the disclosure relates to a dual-speaker system that provides audio privacy. Other aspects are also described.

BACKGROUND

Headphones are audio devices that include a pair of speakers, each of which is placed on top of a user's ear when the headphones are worn on or around the user's head. Similar to headphones, earphones (or in-ear headphones) are two separate audio devices, each having a speaker that is inserted into the user's ear. Both headphones and earphones are normally wired to a separate playback device, such as an MP3 player, that drives each of the speakers of the devices with an audio signal in order to produce sound (e.g., music). Headphones and earphones provide a convenient method by which the user can individually listen to audio content without having to broadcast the audio content to others who are nearby.

SUMMARY

An aspect of the disclosure is an output device, such as a headset or a head-worn device that includes a housing, a first "extra-aural" speaker driver arranged to project sound into an ambient environment in a first direction, and a second extra-aural speaker driver arranged to project sound into the ambient environment in a second direction that is different than the first direction. Both speaker drivers may be integrated within the housing (e.g., being a part of the housing) and share a common back volume within the housing. In some aspects, the common back volume may be a sealed volume in which air within the volume cannot escape into the ambient environment. In one aspect, both speaker drivers may be the same type of driver (e.g., being "full-range" drivers that reproduce as much of an audible frequency range as possible). In another aspect, the speaker drivers may be different types of drivers (e.g., one being a "low-frequency driver" that reproduces low-frequency sounds and the other being a full-range driver).

In another aspect, the output device may be designed differently. For example, the output device may include an elongated tube having a first open end that is coupled to the common back volume within the housing and a second open end that opens into the ambient environment. Thus, air may travel between the back volume and the ambient environment. In one aspect, a sound output level of rear-radiated sound produced by at least one of the first and than a sound output level of front-radiated sound produced by the at least one of the first and second speaker drivers.

In another aspect, the housing of the output device forms an open enclosure that is outside of the common back volume and surrounds a front face of the second speaker driver. In one aspect, the open enclosure is open to the ambient environment through several ports through which the second speaker driver projects front-radiated sound into the ambient environment. In some aspects, the output device may further include the elongated tube, as described above.

In one aspect, a front face of the first speaker driver is directed towards the first direction and a front face of the second speaker driver is directed towards the second direction. In some aspects, the first direction and the second direction are opposite directions along a same axis. In another aspect, the first direction is along a first axis and the second direction is along a second axis, where the first and second axes are separated by less than 180° about another axis.

Another aspect of the disclosure is a method performed by (e.g., a programmed processor) of an output device (e.g., of the dual-speaker system) that includes a first (e.g., extra-aural) speaker driver and a second extra-aural speaker driver that are both integrated within a housing of the output device and share an internal volume as a back volume. The device receives an audio signal (e.g., which may contain user-desired audio content, such as a musical composition). The device determines a current operational mode (e.g., a "non-private" or a "private" operational mode) for the output device. The device generates first and second driver signals based on the audio signal, where the current operational mode corresponds to whether at least portions (e.g., within corresponding frequency bands) of the first and second driver signals are generated to be in-phase or out-of-phase with each other. The device drives the first extra-aural speaker driver with the first driver signal and drives the second speaker driver with the second driver signal.

In one aspect, the device determines the current operational mode by determining whether a person is within a threshold distance of the output device, where, in response to determining that the person is within the threshold distance, the first and second driver signals are generated to be at least partially out-of-phase with each other. In another aspect, in response to determining that the person is not within the threshold distance, the first and the second driver signals are generated to be in-phase with each other.

In one aspect, the device drives the first and second extra-aural speaker drivers with the first and second driver signals, respectively, to produce a beam pattern having a main lobe in a direction of a user of the output device. In another aspect, the produced beam pattern has at least one null directed away from the user of the output device.

In one aspect, the device receives a microphone signal produced by a microphone of the output device that includes ambient noise of the ambient environment in which the output device is located, where the current operational mode is determined based on the ambient noise. In another aspect, the device determines the current operational mode for the output device by determining whether the ambient noise masks the audio signal across one or more frequency bands; in response to the ambient noise masking a first set of frequency bands of the one or more frequency bands, selecting a first operational mode in which portions of the first and second driver signals are generated to be in-phase across the first set of frequency bands; and in response to the ambient noise not masking a second set of frequency bands of the one or more frequency bands, selecting a second operational mode in which portions of the first and second driver signals are generated to be out-of-phase across the second set of frequency bands. In some aspects, the first and second set of frequency bands are non-overlapping bands, such that the output device operates in both the first and second operational modes simultaneously.

Another aspect of the disclosure is a head-worn output device that includes a first extra-aural speaker driver and a second extra-aural speaker driver, where the first driver is closer to an ear of a user (or intended listener) of the head-worn device than the second driver while the head-worn output device is worn on a head of the user. The device also includes a processor and memory having instructions stored therein which when executed by the processor causes the output device to receive an audio signal that includes noise and produce, using the first and second speaker drivers, a directional beam pattern that includes 1) a main lobe that has the noise and is directed away from the user and 2) a null (or notch) that is directed towards the user, wherein a sound output level of the second speaker driver is greater than a sound output level of the first speaker driver.

In one aspect, the audio signal is a first audio signal and the directional beam pattern is a first directional beam pattern, where the memory has further instructions to receive a second audio signal that comprises user-desired audio content (e.g., speech, music, a podcast, a movie soundtrack, etc.), and produce, using the first and second extra-aural speaker drivers, a second directional beam pattern that includes 1) a main lobe that has the user-desired audio content and is directed towards the user and 2) a null that is directed away from the user. In some aspects, the first and second extra-aural speaker drivers project front-radiated sound towards or in a direction of the ear of the user.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Head-worn devices, such as over-the-ear headphones may consist of two housings (e.g., a left housing and a right housing) that are designed to be placed over a user's ears. Each of the housings may include an "internal" speaker that is arranged to project sound (e.g., directly) into the user's respective ear canals. Once placed over the user's ears, each housing may acoustically seal off the user's ear from the ambient environment, thereby preventing (or reducing) sound leakage into (and out of) the housing. During use, sound created by the internal speakers may be heard by the user, while the seals created by the housings help prevent others who are nearby from eavesdropping.

Figure 1:
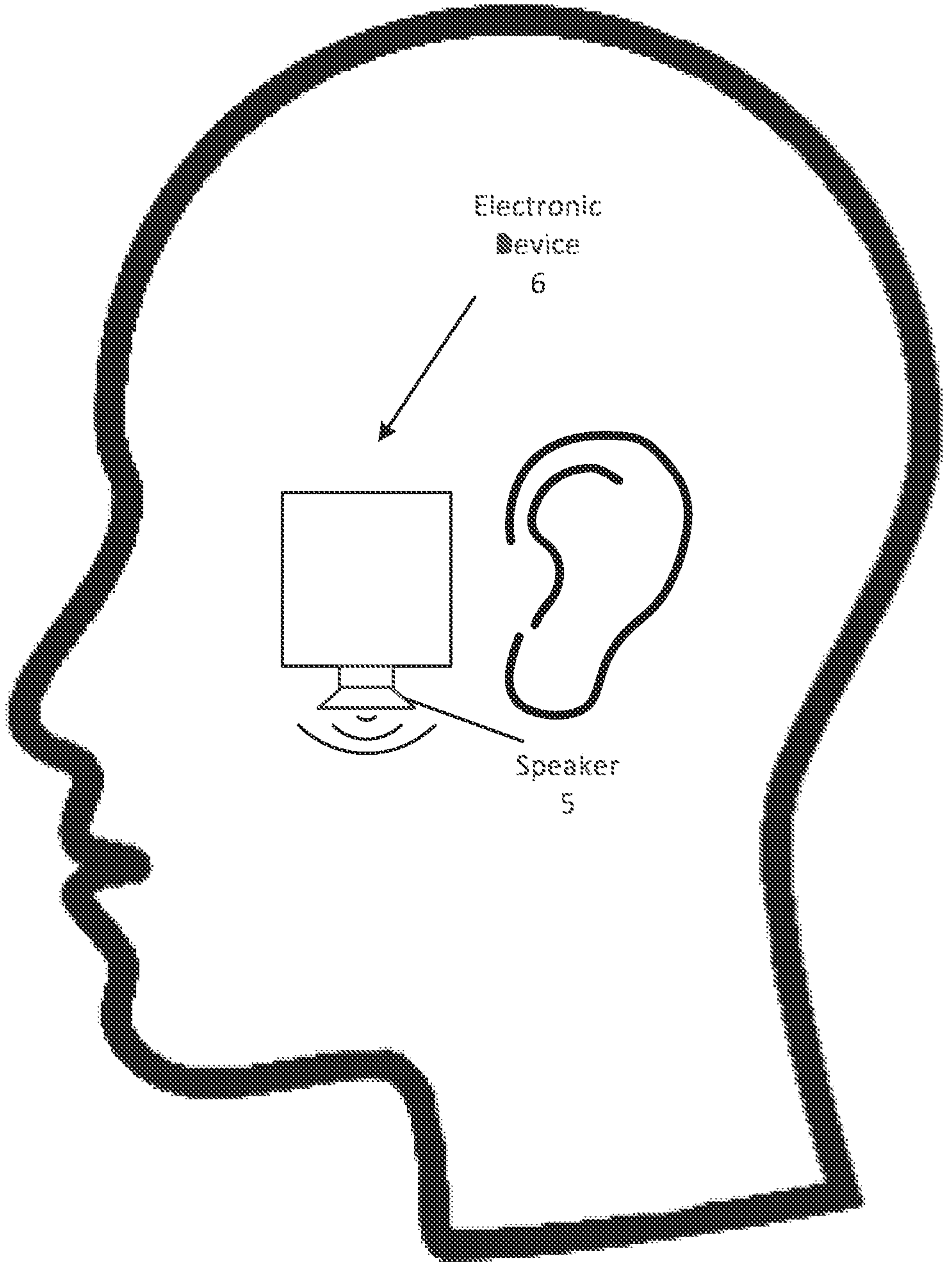
FIG. 1 shows an electronic device with an extra-aural speaker.

In one aspect, a head-worn device may include an "extra-aural" speaker that is arranged to output sound into the environment to be heard by the user of the device. In some aspects, unlike internal speakers that direct sound into the user's ear canals while housings of the device at least partially acoustically seal off the user's ear from the ambient environment, extra-aural speakers may project sound into the ambient environment (e.g., while the user's ears may not be acoustically sealed by the head-worn device). For instance, the speaker may be arranged to project sound in any direction (e.g., away from the user and/or towards the user, such as towards the user's ear). FIG. 1 shows an example of an electronic device 6 with an extra-aural speaker 5 that is projecting sound (e.g., music) into the ambient environment for the user to hear. Since this sound is projected into the environment, nearby people may be able to eavesdrop. In some instances, the user may wish to privately listen to audio content that is being played back by the extra-aural speaker, such as while engaged in a telephone conversation that is of a private nature. In which case, the user may not want others within the user's immediate surroundings from listening to the content. One way to prevent others from listening is to reduce the speaker's sound output. This, however, may adversely affect the user experience when the user is in a noisy environment and/or may not prevent eavesdropping when others are close by. Thus, if a user wishes to listen to private audio content or engage in a private telephone conversation using an extra-aural speaker, the user may be required to walk away and enter a separate space away from others. Such an action, however, may be impractical if the phone call occurs when user cannot find a separate space (e.g., while the user is on a plane or on a bus). Thus, there is a need for an electronic system that may provide audio privacy to the user.

The present disclosure describes a dual-speaker system that is capable of operating in one or more modes, e.g., a "non-private" (first or public) operational mode and a "private" (second) operational mode. Specifically, the system includes an output device with (at least) two speaker drivers (a first speaker driver and a second speaker driver), each of which are a part of (or integrated within a housing of) the output device at different locations, which are arranged to project sound into the ambient environment. In one aspect, both speakers may share a common back volume within a housing of the output device. During operation, (e.g., one or more programmed processors of) the output device receives an audio signal, which may contain user-desired audio content (e.g., a musical composition, a podcast, a movie sound track, etc.), and determines whether the device is to operate (or is operating) in the first operational mode or the second operational mode. For example, the determination may be based on whether a person is detected within a threshold distance from the output device (e.g., by performing image recognition on image data captured by a camera of the system). The system processes the audio signal to produce a first driver signal to drive the first speaker driver and a second driver signal to drive the second speaker driver. While in the first operational mode, both driver signals may be in-phase with each other. In this case, sound waves produced by both speaker drivers may be (e.g., at least partially) in-phase with one another. In one aspect, the combination of the sound waves produced by both drivers may have larger amplitudes than the original waves as a result of constructive interference. While in the second operational mode, however, both driver signals may not be (e.g., entirely) in-phase with each other. In this case, the sound waves produced by both drivers may destructive interfere with one another, resulting in a reduction (or elimination) of sound as experienced at one or more locations within the ambient environment, such as by someone other than the user (e.g., who is at a particular distance away from the user). Thus, as described herein, by driving the speaker drivers with signals that are not in-phase, the user of the output device may hear the user-desired audio content, while potential eavesdroppers within the vicinity of the user may not. Thus, the private operational mode provides audio privacy for the user. In other aspects, depending on certain environmental conditions (e.g., levels of ambient noise) the dual-speaker system may operate in the first operational mode for certain frequencies and simultaneously operate in the second operational mode for other frequencies. More about operating simultaneously in multiple operational modes is described herein.

Figure 2:
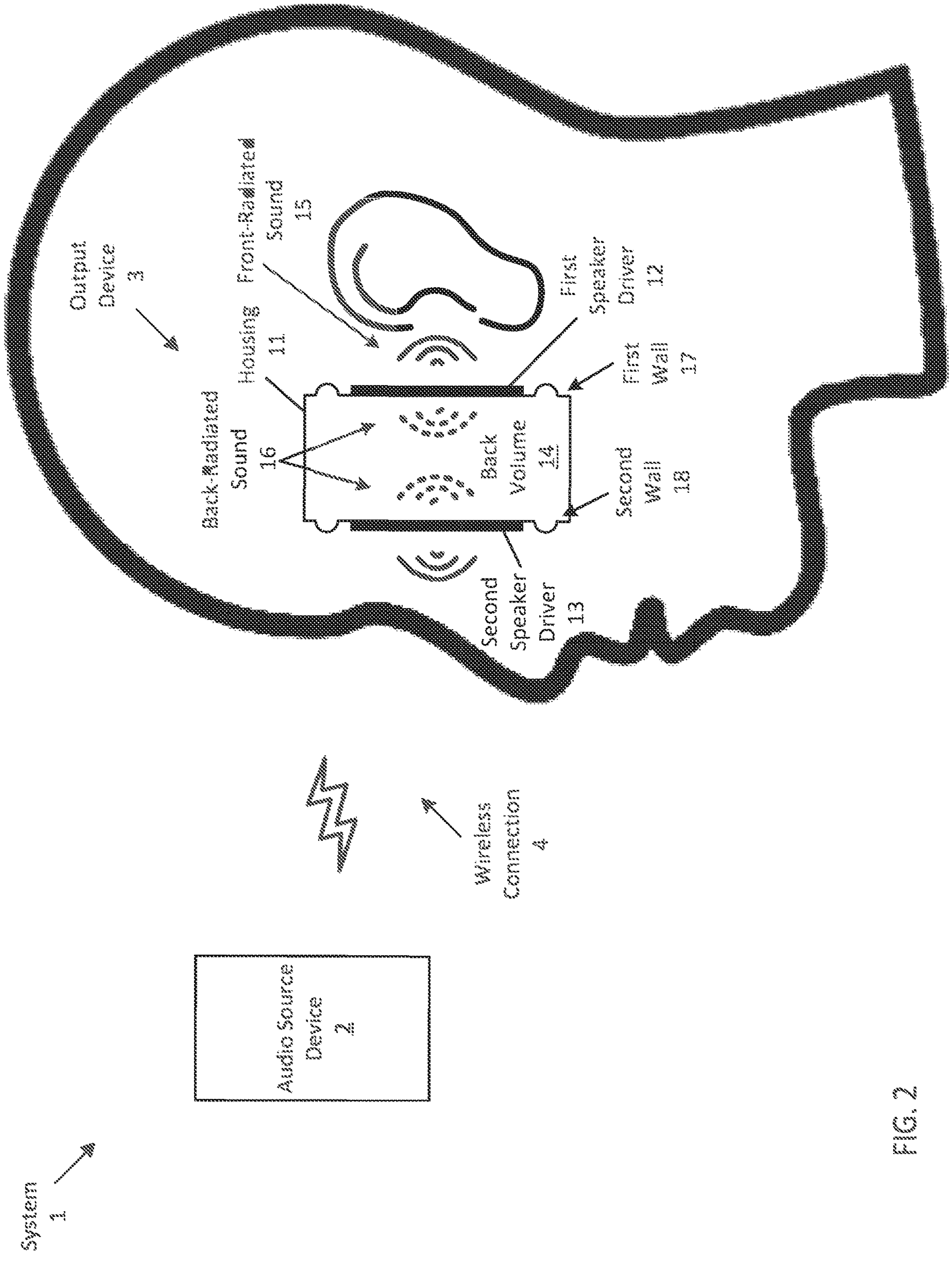
FIG. 2 shows a dual-speaker system with an output device having two speaker drivers that share a common back volume according to one aspect.

FIG. 2 shows a dual-speaker system with an output device having two speaker drivers that share a common back volume according to one aspect. Specifically, this figure illustrates a system (or dual-speaker system) 1 that includes a source device 2 and an output device 3.

In one aspect, the source device 2 may be a multimedia device, such as a smart phone. In another aspect, the source device may be any electronic device (e.g., that includes memory and/or one or more processors) that may be configured to perform audio signal processing operations and/or networking operations. An example of such a device may include a desktop computer, a smart speaker, an electronic server, etc. In one aspect, the source device may be any wireless electronic device, such as a tablet computer, a smart phone, a laptop computer, etc. In another aspect, the source device may be a wearable device (e.g., a smart watch, etc.) and/or a head-worn device (e.g., smart glasses).

The output device 3 is illustrated as being positioned next to (or adjacent to) the user's ear (e.g., within a threshold distance from the user's ear). In one aspect, the output device may be (e.g., a part of) a head-worn device (HWD). For example, the output device may be headphones, such as on-ear or over-the-ear headphones. In the case of over-the-ear headphones, the output device may be a part of a headphone housing that is arranged to cover the user's ear, as described herein. Specifically, the output device may be a left headphone housing. In one aspect, the headphones may include another output device that is a part of the right headphone housing. Thus, in one aspect, the user may have more than one output device, each performing audio signal processing operations to provide audio privacy (e.g., operating in one or more operational modes), as described herein. As another example, the output device may be an in-ear headphone (earphone or earbud). In another aspect, the output device may be any (or a part of any) HWD, such as smart glasses. For instance, the output device may be a part of a component (e.g., the frame) of the smart glasses. In another aspect, the output device may be a HWD that (at least partially) does not cover the user's ear (or ear canal), thereby leaving the user's ear exposed to the ambient environment. In some aspects, the output device is a wearable device, such as a smart watch.

In another aspect, the output device 3 may be any electronic device that is configured to output sound, perform networking operations, and/or perform audio signal processing operations, as described herein. For example, the output device may be a (e.g., stand-alone) loudspeaker, a smart speaker, a part of a home entertainment system, a part of a vehicle audio system. In some aspects, the output device may be a part of another electronic device, such as a laptop, desktop, or multimedia device, such as the source device 2 (as described herein).

The output device 3 includes a housing 11, a first speaker driver 12, and a second speaker driver 13. In one aspect, the output device may include more (or less) speaker drivers. In one aspect, both speaker drivers may be integrated with (or a part of) the housing of the output device at different locations about the output device. As shown, both speaker drivers are located at opposite locations from one another. Specifically, the first speaker driver is positioned on one side (e.g., a back side) of the output device, while the second speaker driver is positioned on an opposite side (e.g., a front side) of the device. In some aspects, the speaker drivers may be positioned differently, such as both speaker drivers being positioned on a same side.

In some aspects, the speaker drivers 12 and 13 may share a common back volume 14 within the housing. Specifically, the back volume is a volume of air that is open to rear faces of each speaker driver's diaphragm. In this figure, the back volume 14 is sealed within the housing of the output device, meaning that the air contained within the volume is constrained within the housing. Thus, in one aspect, the back volume 14 is an open space within the output device 3 that includes the volume of air and is enclosed (or sealed) within the housing of the output device. In some aspects, the back volume may not be constrained within the housing (e.g., as shown and described in FIG. 3).

As shown, both of the speaker drivers 12 and 13 are extra-aural speaker drivers that are arranged to project sound into the ambient environment. In one aspect, the speaker drivers are arranged to project sound in different directions. For instance, the first speaker driver 12 is arranged to project sound in one (first) direction, while the second speaker driver 13 is arranged to project sound in another (second) direction. For example, a front face of the first speaker driver (e.g., a front side of a diaphragm of the speaker driver) is directed towards the first direction and a front face of the second speaker driver is directed towards the second direction. As illustrated, both speaker drivers are directed in opposite directions along a same (e.g., center longitudinal)

axis (not shown) that runs through each of the drivers. Thus, the first speaker driver 12 is shown to be projecting sound towards the ear of the user, while the second speaker driver 13 is shown to be projecting sound away from the ear. In one aspect, the output device may be positioned differently about the user's head (and/or body). In another aspect, one of the speakers may be positioned off center from a center longitudinal axis of the other speaker. For example, the first speaker driver 12 may be directed along a first axis and the second speaker driver may be directed along a second axis, where both axes may be separated by less than 180° about another axis (through which both of the first and second axes intersect).

During operation (of the output device 3), both speaker drivers produce outwardly (or front) radiating sound waves. As shown, both speaker drivers produce front-radiated sound 15 (illustrated as expanding solid black curves) that is projected into the ambient environment (e.g., in directions towards which a front-face of each respective speaker driver is directed), and produce back-radiated sound 16 (illustrated as expanding dashed black curves) that is projected into the back volume 14. As described herein, sound (and more specifically the spectral content) produced by each of the speaker drivers may change based on the operational mode in which the output device is currently operating. More about the operational modes is described herein.

Each of the speaker drivers 12 and 13 may be an electrodynamic driver that may be specifically designed for sound output at certain frequency bands, such as a subwoofer, tweeter, or midrange driver, for example. In one aspect, either of the drivers may be a "full-range" (or "full-band") electrodynamic driver that reproduces as much of an audible frequency range as possible. In one aspect, each of the speaker drivers may be a same type of speaker driver (e.g., both speaker drivers being full-range drivers). In another aspect, both drivers may be different (e.g., the first driver 12 being a woofer, while the second driver 13 is a tweeter). In another aspect, both speakers may produce different audio frequency ranges, while at least a portion of both frequency ranges overlap. For instance, the first driver 12 may be a woofer, while the second driver 13 may be a full-range driver. Thus, at least a portion of spectral content produced by both drivers may have overlapping frequency bands, while other portions of spectral content produced by the drivers may not overlap.

In one aspect, the output device 3 (and/or source device 2) may include more (or less) components as described herein. For example, the output device may include one or more microphones. In particular, the device may include an "external" microphone that is arranged to capture ambient sound and/or may include an "internal" microphone that is arranged to capture sound inside (e.g., the housing 11 of) the output device. For instance, the output device may include a microphone that is arranged to capture back-radiated sound 16 inside the back volume 14. In another aspect, the output device may include one or more display screens that is arranged to present image data (e.g., still images and/or video). In some aspects, the output device may include more (or less) speaker drivers.

As shown, the source device 2 is communicatively coupled to the output device 3, via a wireless connection 4. For instance, the source device may be configured to establish a wireless connection with the output device via any wireless communication protocol (e.g., BLUETOOTH protocol). During the established connection, the source device may exchange (e.g., transmit and receive) data packets (e.g., Internet Protocol (IP) packets) with the output device, which may include audio digital data. In another aspect, the source device may be coupled to the output device via a wired connection. In some aspects, the source device may be a part of (or integrated into) the output device. For example, as described herein, at least some of the components (e.g., at least one processor, memory, etc.) of the source device may be a part of the output device. As a result, at least some (or all) of the operations to operate (and/or switch between) several operational modes may be performed by (e.g., at least one processor of) the source device, the output device, or a combination thereof.

As described herein, the output device 3 is configured to output one or more audio signals through at least one of the first and second speaker drivers 12 and 13 while operating in at least one of several operational modes, such as a public mode or a private mode. While in the public mode, the output device is configured to drive both speaker drivers in-phase with one another. In particular, the output device drives both speakers with driver signals that are in-phase with each other. In one aspect, the driver signals may contain the same audio content for synchronized playback through both speaker drivers. In one aspect, both speaker drivers may be driven with the same driver signal (which may be an input audio signal, such as a left audio channel of a musical composition). Thus, driving both speaker drivers in-phase results in the front-radiated sound 15 constructively interfering, thereby producing an omnidirectional sound pattern that contains the audio content (or being a monopole sound source). In one aspect, at least one of the driver signals may be (e.g., slightly) out-of-phase with the other driver signal in order to account for a distance between both speakers. For example, the (e.g., processor of the) output device 3 may apply a phase shift upon (e.g., at least a portion of) a first driver signal used to drive the first speaker driver and not phase shift a second driver signal (which may be the same as (or different than) the original first driver signal) used to drive the second speaker driver. More about applying phase shifts is described herein.

While in the private mode, the output device 3 is configured to drive both speaker drivers not in-phase with one another. Specifically, the output device drives both speaker drivers with driver signals that are not in-phase with each other. In one aspect, both driver signals may 180° (or less than 180°) out-of-phase with each other. Thus, the phrase "out-of-phase" as described hereafter may refer to two signals that are not in-phase by 0°-180°. For example, the output device may process an audio signal (e.g., by applying one or more audio processing filters) to produce driver signals that are not in-phase. When used to drive both driver signals that are not in-phase with each other, the output device may produce a dipole sound pattern having a first lobe (or "main" lobe) with the audio content and a second (or "rear" lobe) that contains out-of-phase audio content with respect to the audio content contained within the main lobe. In which case, the user of the output device may primarily hear the audio content within the main lobe. Others, however, who are positioned further away from the output device than the user of the output device (e.g., outside a threshold distance) may not hear the audio content due to destructive interference which is caused by the rear lobe. In one aspect, a frequency response of the dipole may have a sound pressure level that is less than a frequency response of a monopole (e.g., produced while in the public mode) by between 15-40 dB (e.g., at a given (threshold) distance from the output device).

In one aspect, the output device may operate in both private and public modes (e.g., simultaneously). In which case, the driver signals may be (at least) partially in-phase and (at least) partially out-of-phase. Specifically, spectral content contained within the driver signals may be partially in-phase and/or partially out-of-phase. For example, high-frequency content contained within each of the driver signals may be partially (or entirely) in-phase, while low-frequency content contained within the drivers may be at least partially out-of-phase. More about operating in both modes is described herein.

As described herein, the application of one or more signal processing operations (e.g., spatial filters) upon the audio signal produces one or more sound patterns, which may be used to selectively direct sound towards a particular location in space (e.g., the user's ear) and away from another location (e.g., where a potential eavesdropper is located). More about producing sound patterns is described herein.

Returning to FIG. 2, having a constrained volume of air in the back volume 14 may affect the performance of the output device 3, regardless of which mode the device is operating. In one aspect, the output device may have low low-frequency efficiency, meaning the device does not have an extended low-frequency range based on one or more physical characteristics. For example, the housing 11 of the output device may be small, which may increase the resonance frequency of the device, which may be in contrast to a larger output device (which may also have a greater low-frequency efficiency). In addition, the constrained volume of air acts as a "stiff" spring that reduces potential displacement of a speaker driver's diaphragm. This reduction may also attribute to the increase of resonance frequency. In another aspect, the output device may have reduced low-frequency efficiency while operating in the privacy mode, due to destructive interference at low frequencies.

Figure 3:
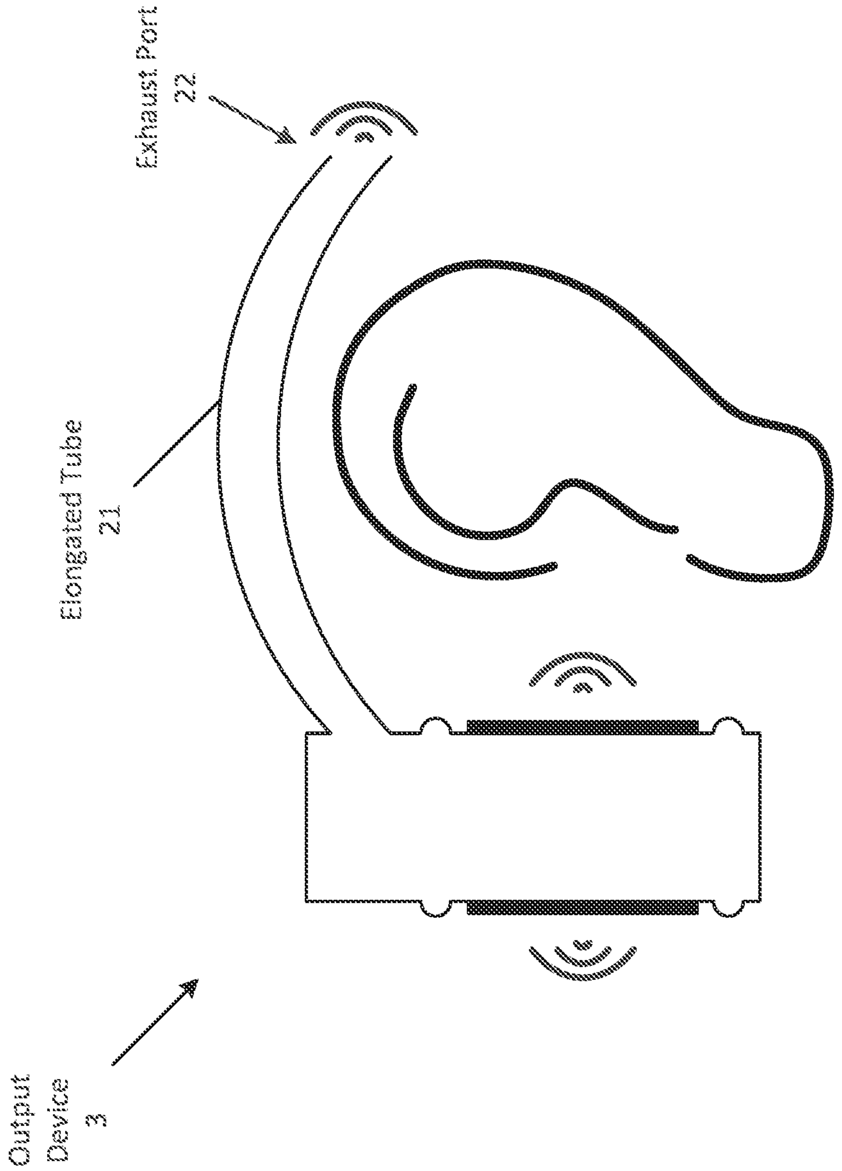
FIG. 3 shows the output device with an exhaust port according to one aspect.
Figure 4:
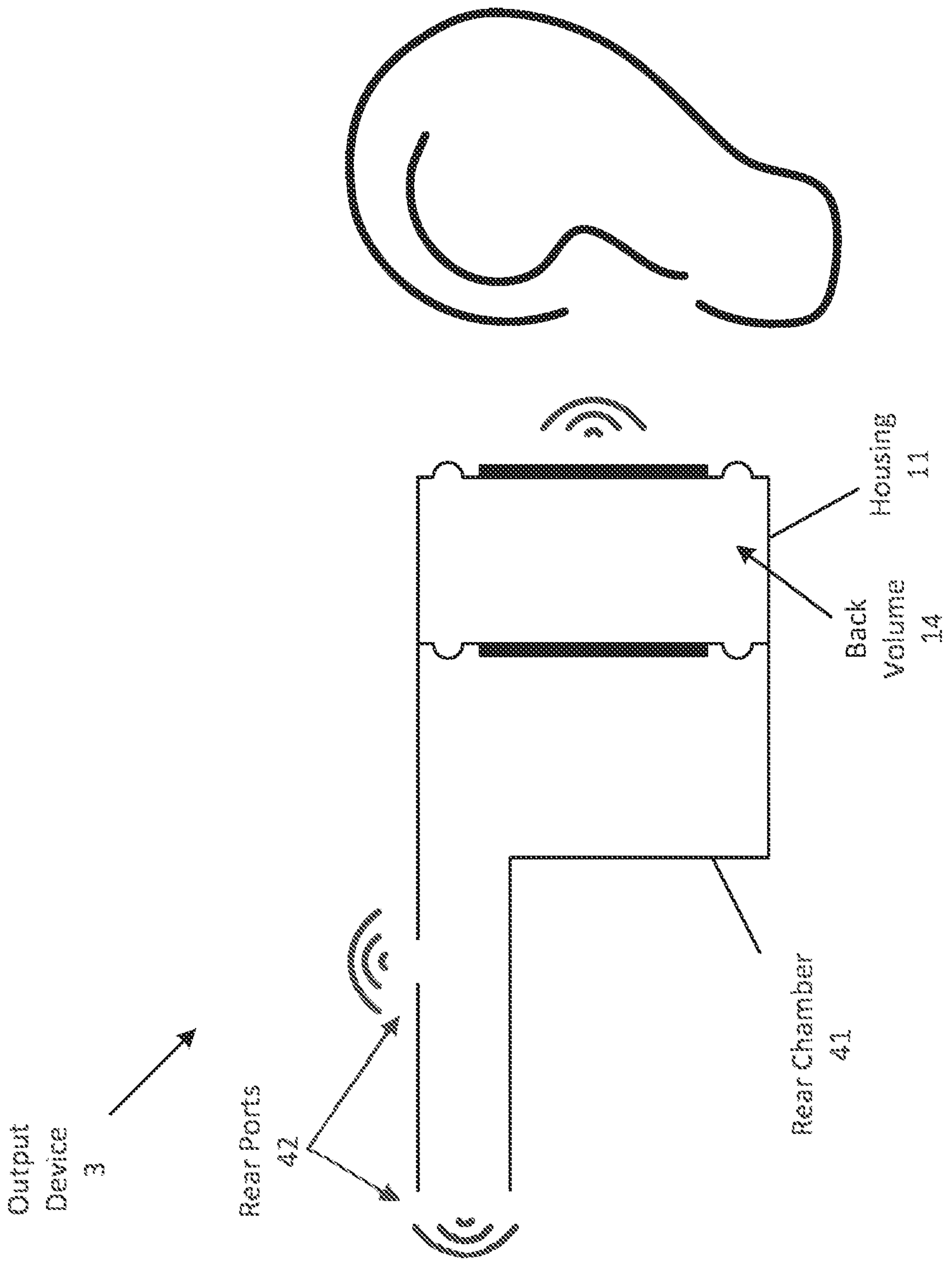
FIG. 4 shows the output device with a rear chamber according to one aspect.
Figure 5:
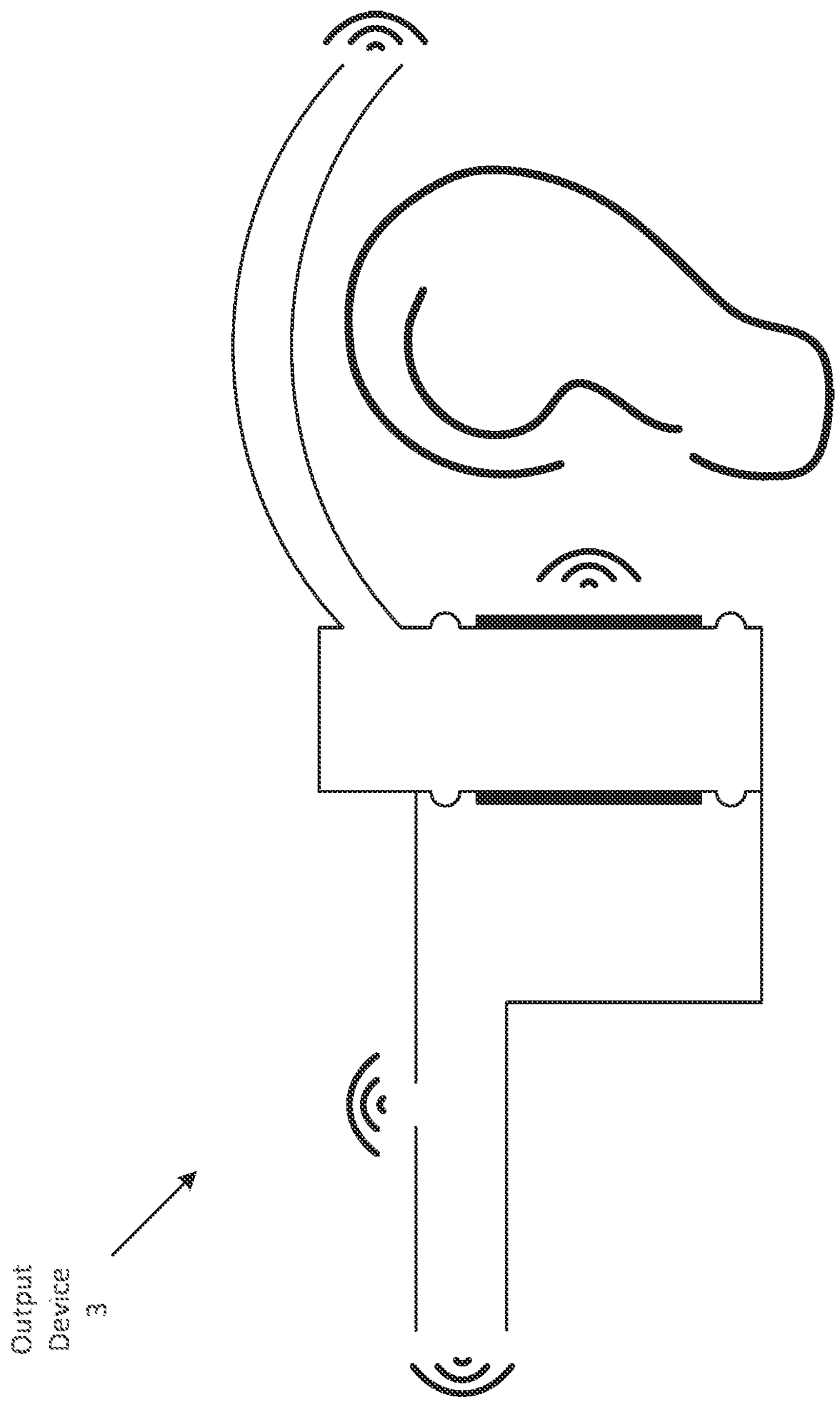
FIG. 5 shows an output device with both an exhaust port and a rear chamber according to one aspect.

FIGS. 3-5 show the output device 3 with one or more physical characteristics (or features), and show that the output device is adjacent to an ear of a user. In particular, (e.g., at least a portion of) the output device may be positioned within a threshold distance of the ear of the user, while the output device is worn (or in use) by the user.

FIG. 3 shows the output device 3 with an exhaust port according to one aspect. Specifically, the output device includes an elongated tube (or member) 21 having a first open end that is coupled to the common back volume 14 within the housing 11 and a second open end (or exhaust port 22) that opens into the ambient environment. In one aspect, the tube fluidly couples the back volume to the ambient environment, such that the volume of air that was constrained within the housing in FIG. 2, is now able to flow between the common back volume and the ambient environment. Thus, changes in sound pressure within the housing, caused by back-radiated sound (illustrated as being emitted by the exhaust port 22) from the speaker drivers, results in movement of air into and out of the exhaust port.

In one aspect, the elongated tube may have any size, shape, and length. In another aspect, the length of the tube may be sized such that the sound level at the exhaust port is less than the sound level at one or more of the speaker drivers 12 and 13. For example, a sound output level of rear-radiated sound produced by the first (and/or second) speaker driver (as measured or sensed) at the exhaust port 22 is at least 10 dB SPL less than a sound output level of front-radiated sound produced by the same speaker driver. As a result, the sound output of the exhaust port may not adversely affect the sound experience of the user of the output device. In another aspect, the sound output level at the user's ear may be less than the sound output level at the exhaust port by at least a particular threshold. For instance, the position of the exhaust portion may be such, that the sound output level at the user's ear (which is closest to the exhaust port) is at least 10 dB SPL less than at the port itself. In some aspects, the elongated tube may be shaped to reduce the audibility of the back-radiated sound that is expelled by the port 22. For instance, the elongated tube may be shaped so that the exhaust port is (at least partially) behind the user's ear, such that the user's ear may block at least a portion of the sound produced by the port. In another aspect, the tube may be shaped and/or positioned differently. In some aspects, the sound projected by the exhaust port may be inaudible to the user of the output device.

In one aspect, the exhaust port may provide better low-frequency efficiency than the output device without the exhaust port, as illustrated in FIG. 2, for example. Specifically, since the air in the housing is no longer constrained and is therefore able to move out and in, the low-frequency efficiency is improved while the output device drives at least one of the speaker drivers.

FIG. 4 shows the output device with a rear chamber according to one aspect. In particular, this figure shows that the housing 11 of the output device 3 forms a rear chamber 41 (or open enclosure) that is outside of the common back volume 14 and surrounds (e.g., a front face of) the second speaker driver 13. Thus, as shown, the common back volume contains constrained air, as shown in FIG. 2, and has the rear chamber formed around the second speaker. In one aspect, the rear chamber may be a part of the housing so as to make one integrated unit. In another aspect, the rear chamber may be removably coupled to (a remainder of) the housing such that the rear chamber may be attached and/or detached from the housing.

The rear chamber 41 includes one or more rear ports 42. The chamber is designed to open to the ambient environment through the ports through which the second speaker driver 13 projects front-radiated sound into the ambient environment. In one aspect, each of the ports are positioned such that the front-radiated sound of the second speaker driver is radiated at one or more frequencies. Specifically, each of the ports may emulate a monopole sound source, thereby creating a multi-dipole while the output device operates in the private mode (e.g., while both speaker drivers output audio content that is at least partially out-of-phase with one another). In one aspect, each of the monopole sound sources of the rear ports has different spectral content according to its position with respect to the second speaker driver. For example, a furthest positioned rear port from the second speaker driver (e.g., along the center longitudinal axis running through the speaker driver) may output (primarily) low-frequency audio content. As ports get closer to the second speaker driver (and further away from the furthest rear port), these ports may output higher frequency audio content than ports that are further away from the second speaker driver.

In one aspect, the output device may control how the rear ports output audio content by adjusting how the second speaker driver is driven. As a result, the rear chamber may provide the output device with better low-frequency efficiency and less distortion based on how the second speaker driver is adapted (e.g., the output spectral content of the speaker). More about controlling the output of the rear ports is described herein.

In one aspect, the rear chamber 41 may be positioned such that a sound level of front-radiated sound projected from the rear ports 42 at the user's position (e.g., the user's ear) is less than a sound level of front radiated sound of the first speaker driver 12 (and/or the second speaker driver 13). For example, the front-radiated sound projected from the rear ports may be at least 6 dB lower than front-radiated sound of the first speaker driver.

FIG. 5 shows the output device with both the exhaust port and the rear chamber according to one aspect. Thus, in this figure the output device is a combination of the output device in FIGS. 3 and 4. As a result, the output device may include the advantages in performance that are attributed to having the elongated tube and the rear chamber. For example, while operating in the public mode, although the device may not provide (sufficient) privacy, the relief in internal air pressure due to the exhaust port provides good low-frequency efficiency and has little distortion. While operating in the private mode, the output device may control the performance of the second speaker driver to produce a multi-dipole in order to increase low-frequency efficiency (due to less destructive interference) and less distortion (due to less speaker driver excursion that is required).

Figure 6:
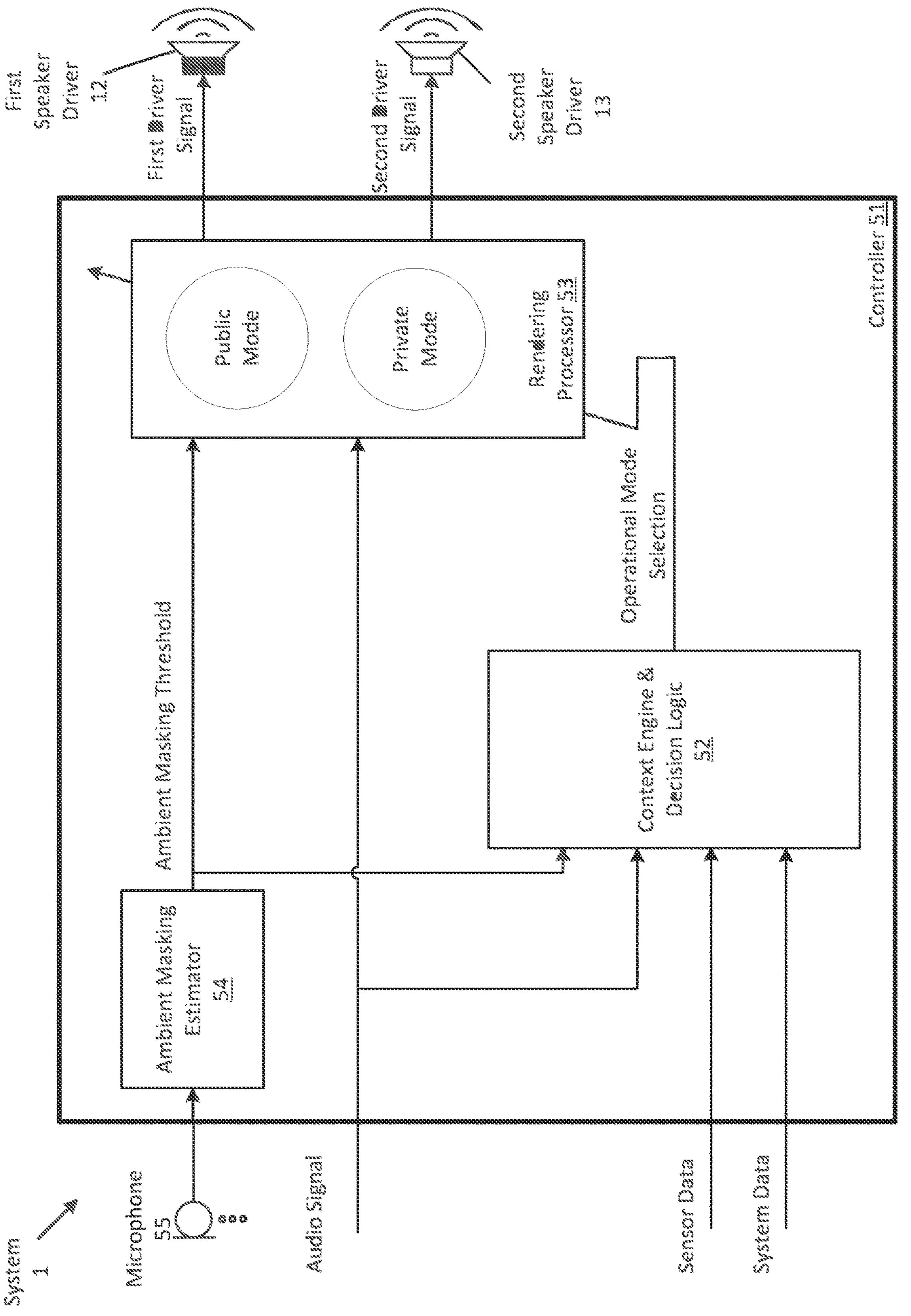
FIG. 6 shows a block diagram of the system that operates in one or more operational modes according to one aspect.

FIG. 6 shows a block diagram of the system 1 that operates in one or more operational modes according to one aspect. Specifically, this figure shows the system 1 that includes a controller 51, at least one (e.g., external) microphone 55, the first (extra-aural) speaker driver 12, and the second (extra-aural) speaker driver 13. In one aspect, each of these components may be a part of the (e.g., integrated into a housing of the) output device 3. In another aspect, at least some of the components may be a part of the output device and the source device 2, illustrated in FIG. 2. For example, the speaker drivers may be integrated into (e.g., the housing of) the output device, while the controller may be integrated into the source device. In this case, the controller may perform audio privacy operations as described herein to generate one or more driver signals that are transmitted (e.g., via a connection, such as the wireless connection 4 of FIG. 2) to the output device to drive the speaker drivers to produce sound.

The controller 51 may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). The controller is configured to perform audio signal processing operations, such as audio privacy operations and networking operations as described herein. More about the operations performed by the controller is described herein. In one aspect, operations performed by the controller may be implemented in software (e.g., as instructions stored in memory of the source device (and/or memory of the controller) and executed by the controller and/or may be implemented by hardware logic structures. In one aspect, the output device may include more elements, such as memory elements, one or more display screens, and one or more sensors (e.g., one or more microphones, one or more cameras, etc.). For example, one or more of the elements may be a part of the source device, the output device, or may be a part of separate electronic devices (not shown).

As illustrated, the controller 51 may have one or more operational blocks, which may include a context engine & decision logic 52 (hereafter may be referred to as context engine), a rendering processor 53, and an ambient masking estimator 54.

The ambient masking estimator 54 is configured to determine an ambient masking threshold (or masking threshold) of ambient sound within the ambient environment. Specifically, the estimator is configured to receive a microphone signal produced by the microphone 55, where the microphone signal corresponds to (or contains) ambient sound captured by the microphone. The estimator is also configured to use the microphone signal to determine a noise level of the ambient sound as the masking threshold. Audible masking occurs when the perception of one sound is affected by the presence of another sound. In one aspect, the estimator determines the frequency response of the ambient sound as the threshold. Specifically, the estimator determines the magnitude (e.g., dB) of spectral content contained within the microphone signal. In some aspects, the system 1 uses the masking threshold to determine how to process the audio signal, as described herein.

In one aspect, the context engine 52 is configured to determine (or decide) whether the output device 3 is to operate in one or more operational modes (e.g., the public mode or the private mode). Specifically, the context engine is configured to determine whether (e.g., a majority of the) sound output by the first and second speaker drivers is to only to be heard by the user (or wearer) of the output device. For example, the context engine determines whether a person is within a threshold distance of the output device. In one aspect, in response to determining that a person is within the threshold distance, the context engine selects the private mode as a mode selection, while, in response to determining that the person is not within the threshold distance, the context engine selects the public mode as the mode selection. In particular, to make this determination the context engine receives sensor data from one or more sensors (not shown) of the system 1. For instance, the (e.g., output device of the) system may include one or more cameras that are arranged to capture image data of a field of view of the camera. The context engine is configured to receive the image data (as sensor data) from the camera, and is configured to perform an image recognition algorithm upon the image data to detect a person therein. Once a person is detected therein, the context engine determines the location of the person with respect to a reference point (e.g., a position of the output device, a position of the camera, etc.). For example, when the camera is a part of the output device, the context engine may receive sensor data that indicates a position and/or orientation of the output device (e.g., from an inertial measurement unit (IMU) integrated within the output device). Once the position of the output device is determined, which may correspond to the position of the camera, the context engine determines the location of the person with respect to the position of the output device by analyzing the image data (e.g., pixel height and width).

In one aspect, the determination may be based on whether a particular object (or place) is within a threshold distance of the user. For instance, the context engine 52 may determine whether another output source (e.g., a television, a radio, etc.) is within a threshold distance. As another example, the engine may determine whether the location at which the user is located is a place where the audio content is to only be heard by the user (e.g., a library).

In another aspect, the context engine may obtain other sensor data to determine whether the person (object or place) is within the threshold distance. For instance, the context engine may obtain proximity sensor data (e.g., from one or more proximity sensors of the output device). In some aspects, the context engine may obtain sensor data from another electronic device. For instance, the controller 51 may obtain data from one or more electronic devices within the vicinity of the output device, which may indicate the position of the devices.

In some aspects, the context engine may obtain user input data (as sensor data), which indicates a user selection of either mode. For instance, a (e.g., touch-sensitive) display screen of the source device may receive a user-selection of a graphical user interface (GUI) item displayed on the display screen for initiating (or activating) the public mode (and/or the private mode). Once received, the source device may transmit the user-selection to the controller 51 as sensor data.

In one aspect, the context engine 52 may determine which operational mode to operate based on a content analysis of the audio signal. Specifically, the context engine may analyze the (user-desired) audio content contained within the audio signal to determine whether the audio content is of a private nature. For example, the context engine may determine whether the audio content contains words that indicate that the audio content is to be private. In another aspect, the engine may analyze the type of audio content, such as a source of the audio signal. For instance, the engine may determine whether the audio signal is a downlink signal received during a telephone call. If so, the context engine may deem the audio signal as private.

In one aspect, the context engine 52 may determine which mode to operate based on system data. In some aspects, system data may include user preferences. For example, the system may determine whether the user of the output device has preferred a particular operational mode while a certain type of audio content is being outputted through the speaker drivers. For instance, the context engine may determine to operate in public mode, when the audio content is a musical composition and in the past the user has listened to this type of content in this mode. Thus, the context engine may perform a machine-learning algorithm to determine which mode to operate based on how the user has listened to audio content in the past.

In another aspect, the system data may indicate system operating parameters (e.g., an "overall system health") of the system. Specifically, the system data may relate to operating parameters of the output device, such as a battery level of an internal battery of the output device, an internal temperature (e.g., a temperature of one or more components of the output device), etc. In one aspect, the context engine may determine to operate in the public mode in response to the operating parameters being below a threshold. As described herein, while operating in the private mode, distortion may increase due to high driver excursion. This increased excursion is due to providing additional power (or more power than would otherwise be required while operating in the public mode) to the speaker drivers. Thus, in response to the battery level being below a threshold, the context engine may determine to operate in the public mode in order to conserve power. Similarly, the high driver excursion may cause an increase in internal temperature (or more specifically driver temperature) of the output device. If the temperature is above a threshold, the context engine may select the public mode. In one aspect, in response to the operating parameters (or at least one operating parameter) being above a threshold, the context engine may select the public mode.

In another aspect, the context engine may rely on one or more conditions to determine which operational mode to operate in, as described herein. Specifically, the context engine may select a particular operational mode based upon a confidence score that is associated with the conditions described herein. In one aspect, the more conditions that are satisfied, the higher the confidence score. For example, the context engine may designate the confidence score as high (e.g., above a confidence threshold) upon detecting that a person is within a threshold and detecting that the user is in a location at which the system operates in private mode. Upon exceeding the confidence threshold, the context engine selects the private mode. In some aspects, the context engine will operate in public mode (e.g., by default), until a determination is made to switch to private mode, as described herein.

In one aspect, the context engine may select one of the several operational modes based on ambient noise within the environment. In particular, the context engine may select modes according to the (e.g., magnitude of) spectral content of the estimated ambient masking threshold. For example, the context engine may select the public mode in response to the ambient masking threshold having significant low-frequency content (e.g., by determining that at least one frequency band has a magnitude that is higher than a magnitude of another higher frequency band by a threshold). Conversely, the context engine may select the private mode in response to the ambient masking threshold having significant high-frequency content. As described herein, the output device may render the audio signal such that spectral content of the audio signal matching the spectral content of the ambient masking threshold is outputted so as to mask the sounds from others.

As described thus far, the context engine may select one of the several operational modes based on one or more parameters, such as the ambient noise within the environment. In another aspect, the context engine may select one or more (e.g., both the public and private) operational modes for which the system (or the output device 3) may simultaneously operate based on the ambient noise (e.g., in order to maximize privacy while the output device produces audio content). In one aspect, this may be a selection of a third operational mode. In particular, the context engine may select a "public-private" (or third) operational mode, in which the controller applies audio signal processing operations upon the audio signal based on operations described herein relating to both the public and private operational modes. In which case, the (e.g., rendering processor 53 of the) system 1 may generate driver signals of the audio signal with some spectral content that is in-phase, while other spectral content is (at least partially) out-of-phase, as described herein. Specifically, the context engine may determine whether different portions of spectral content of the audio signal are to be processed differently according to different operational modes based on the (e.g., amount of) spectral content of the ambient noise. For example, the context engine may determine whether a portion (e.g., a signal level) of spectral content (e.g., spanning one or more frequency bands) of the ambient noise exceeds a threshold (e.g., a magnitude). In one aspect, the threshold may be a predefined threshold. In another aspect, the threshold may be based on the audio signal. In particular, the threshold may be a signal level of corresponding spectral content of the audio signal. In which case, the context engine may determine whether (at least a portion of) the ambient noise will mask (e.g., corresponding portions of) the audio signal. For instance, the context engine may compare the signal level of the ambient noise with a signal level of the audio signal, and determines whether spectral content (e.g., low-frequency content) of the ambient noise is loud enough to mask corresponding (e.g., low-frequency) content of the audio signal.

If the ambient noise does exceed the threshold, the context engine may select a corresponding spectral portion of the audio signal (e.g., spanning the same one or more frequency bands) to operate according to the public mode, since the ambient noise may sufficiently mask this spectral content of the audio signal. Conversely, if (e.g., another) portion of spectral content of the ambient noise does not exceed the threshold (e.g., meaning that the audio content of the audio signal may be louder than the ambient noise), the context engine may select another corresponding spectral portion of the audio content to operate according to the private mode. In which case, once both modes are selected, rendering processor may process the corresponding spectral portions of the audio content according to the selected modes. Specifically, the rendering processor may generate driver signals based on the audio signal in which at least some corresponding portions of the driver signals are in-phase, while at least some other corresponding operations of the driver signals are generated out-of-phase, according to the selections made by the context engine. More about the rendering processor is described herein.

In one aspect, once a determination is made for which operational mode the output device is to operate, the context engine may transmit one or more control signals to the rendering processor 53, indicating a selection of one (or more) operational modes, such as either the public mode or the private mode. The rendering processor 53 is configured to receive the control signal(s) and is configured to process the audio signal to produce (or generate) a driver signal for each of the speaker drivers according to the selected mode. As described herein, in response to selecting the public mode, the rendering processor 53 may generate first and second driver signals that contain audio content of the audio signal and are in-phase with each other. In one aspect, the rendering processor may drive both speaker drivers 12 and 13 with the audio signal, such that both driver signals have the same phase and/or amplitude. In one aspect, the rendering processor may perform one or more audio signal processing operations (e.g., performing equalization operations, spectrally shaping) the audio signal.

In response to selecting private mode, the rendering processor may generate the two driver signals, where one of the driver signals is not in-phase with the other driver signal. In one aspect, the processor may apply one or more linear filters (e.g., low-pass filter, band-pass filter, high-pass filter, etc.) upon the audio signal, such that one of the driver signals is out-of-phase (e.g., by 180°) with respect to the other driver signal (which may be similar or the same as the audio signal). In another aspect, the rendering processor may produce driver signals that are at least partially in-phase (e.g., between 0°-180°). In another aspect, the rendering processer may perform other audio signal processing operations, such as applying one or more scalar (or vector) gains, such that the signals have different amplitudes. In some aspects, the rendering processor may spectrally shape the signals differently, such that at least some frequency bands shared between the signals have the same (or different) amplitudes.

In response to a selection of both public and private modes (or the public-private mode), the rendering processor may generate the two driver signals, where a first portion of corresponding spectral content of the signals is in-phase and a second portion of corresponding spectral content of the signals is (e.g., at least partially) out-of-phase. In this case, the control signals from the context engine may indicate which spectral content (e.g., frequency bands) is to be in-phase (based on a selection of public mode), and/or may indicate which spectral content is to be out-of-phase.

In one aspect, the output device 3 is configured to produce beam patterns. For instance, while operating in the public mode, driving both speaker drivers 12 and 13 with in-phase driver signals produces an omnidirectional beam pattern, such that the user of the output device and others within the vicinity of the output device may perceive the sound produced by the speakers. As described herein, driving the two speaker drivers with driver signals that are out-of-phase, creates a dipole. Specifically, the output device produces a beam pattern having a main lobe that contains the audio content of the audio signal. In one aspect, the rendering processor is configured to direct the main lobe towards the (e.g., ear of the) user of the output device by applying one or more (e.g., spatial) filters. For instance, the rendering processor is configured to apply one or more spatial filters (e.g., time delays, phase shifts, amplitude adjustments, etc.) to the audio signal to produce the directional beam pattern. In one aspect, the direction at which the main lobe is directed towards may be a pre-defined direction. In another aspect, the direction may be based on sensor data (e.g., image data captured by a camera of the output device that indicates the position of the user's ear with respect to the output device). In one aspect, the rendering processor may determine the direction of the beam pattern and/or positions of nulls of the pattern based on a location of a potential eavesdropper within the ambient environment. For instance, the context engine may transmit location information of one or more persons within the ambient environment to the rendering processor, which may filter the audio signal such that the main lobe is directed in a direction towards the user, and at least one null is directed away from the user (e.g., having a null directed towards the other person within the environment).

In some aspects, the rendering processor may direct the main lobe towards the user of the output device and/or one or more nulls towards another person (e.g., while in private and/or public-private mode). In another aspect, the rendering processor may direct nulls and/or lobes differently. For instance, the rendering processor may be configured to produce one or more main lobes, each lobe may be directed towards someone in the environment other than the user (or intended listener) of the output device. In addition to (or in lieu of) directing main lobes to others, the rendering processor may direct one or more nulls towards the user of the output device. As a result, the system may direct some sound away from the user of the device, such that the user does not perceive (or perceives less) audio content than others within the ambient environment. This type of beam pattern configuration may provide privacy to the user of the audio content, when the beam patterns include (masking) noise. More about producing beam patterns with noise is described in FIGS. 8-11.

In one aspect, the rendering processor 53 processes the audio signal based on the ambient masking threshold received from the estimator 54. As described herein, the context engine may select one or more operational modes based on the spectral content of the ambient noise within the environment. In addition, the rendering processor may process the audio signal according to the spectral content of the ambient noise. For example, as described herein, the context engine may select the public mode in response to significant low-frequency ambient noise spectral content. In one aspect, the rendering processor may render the audio signal to output (corresponding) low-frequency spectral content in the selected mode. In this way, the spectral content of the ambient noise may help to mask the outputted audio content from others who are nearby, while the user of the output device may still experience the audio content.

In addition, the rendering processor 53 may process the audio signal according to one or more operational mode selections by the context engine. For instance, upon receiving an indication from the context engine of a selection of both the private and public modes, the rendering processor may produce (or generate) driver signals based on the audio signal that are at least partially in-phase and at least partially out-of-phase with each other. In one aspect, to operate simultaneously in both modes such that the driver signals are in-phase and out-of-phase, rendering processor may process the audio signal based on the ambient noise within the environment. Specifically, the rendering processor may determine whether (or which) spectral content of the ambient noise will mask the user-desired audio content to be outputted by the speaker drivers. For example, the rendering processor may compare (e.g., a signal level of) the audio signal with the ambient masking threshold. A first portion of spectral content of the audio signal that is below (or at) the threshold may be determined to be masked by the ambient content, whereas a second portion of spectral content of the audio signal that is above the threshold may be determined to be heard by an eavesdropper. As a result, when generating the driver signals, the rendering processor may process the first portion of spectral content according to the public mode operations, where spectral content of the driver signals that corresponds to the first portion may be in-phase; and the processor may process the second portion of spectral content according to the private mode operations, where spectral content of the driver signals that corresponds to the second portion may be at least partially out-of-phase. In some aspects, the determination of which spectral content (or rather which of one or more frequency bands) are to be processed according to either mode may be performed by the rendering processor, as described above. In another aspect, the context engine may provide (e.g., along with the operational mode selection) an indication of what spectral content of the audio signal is to be processed according to one or more of the selected operational modes.

In another aspect, the rendering processor may process (e.g., perform one or more audio signal processing operations) upon the audio signal (and/or driver signals) based on the ambient noise. Specifically, the rendering processor may determine whether the ambient noise will mask the user-desired audio content to be outputted by the speaker drivers such that the user of the output device may be unable to hear the content. For instance, the processor may compare (e.g., a signal level of) the audio signal with ambient masking threshold. In one aspect, the rendering processor compares a sound output level of (at least one of) the speaker drivers with the ambient masking threshold to determine whether the user of the output device will hear the user-desired audio content over ambient noise within the ambient environment. In response to the sound output level being below the ambient masking threshold, the rendering processor may increase the sound output level of at least one of the speaker drivers to exceed the noise level. For instance, the processor may apply one or more scaler gains and/or one or more filters (e.g., low-pass filter, band-pass filter, etc.) upon the audio signal (and/or the individual driver signals). In some aspects, the processor may estimate a noise level at a detected person's location within the environment based on the person's location and the ambient masking threshold to produce a revised ambient masking threshold that represents the noise level estimate at the person's location. The rendering processor may be configured to process the audio signal such that the sound output level exceeds the ambient masking threshold, but is below the revised ambient masking threshold, such that the sound increase may not be experienced by the potential eavesdropper.

In one aspect, the rendering processor 53 is configured to provide the user of the output device with a minimum amount of privacy (e.g., while operating in the private mode) that is required to prevent others from listening in, while minimizing output device resources (e.g., battery power, etc.) that are required to output user-desired audio content. Specifically, the rendering processor determines whether the ambient masking threshold (or noise level of the ambient sound) exceeds a maximum sound output level of the output device. In one aspect, the maximum sound output level may be a maximum power rating of at least one of the first and second speaker drivers 12 and 13. In another aspect, the maximum sound output level may be a maximum power rating of (at least one) amplifier (e.g., Class-D) that is driving at least one of the speaker drivers. In another aspect, the maximum sound output level may be based on a maximum amount of power is available by the output device for driving the speaker drivers. For instance, if the ambient masking threshold is above the maximum sound output level (e.g., by at least a predefined threshold), the rendering processor may not output the audio signal, since more power is required to overcome the masking threshold than available in order for the user to hear the audio content. In one aspect, upon determining that sound output by the output device is unable to overcome the noise level while operating in the private mode, the rendering processor may be reconfigured to output the user-desired audio content in the public mode. In some aspects, the output device may output a notification (e.g., an audible notification), requesting authorization by the user for outputting the audio content in the public mode. Once an authorization is received 9 e.g., via a voice command), the output device may begin outputting sound.

In one aspect, the rendering processor may adjust audio playback according to the ambient masking threshold as a function of frequency (and signal-to-noise ratio). In particular, the rendering processor may compare spectral content the ambient masking threshold with the audio signal. For example, the rendering processor may compare a magnitude of a low-frequency band of the masking threshold with a magnitude of the same low-frequency band of the audio signal. The rendering processor may determine whether the magnitude of the masking threshold is greater than the magnitude of the audio signal by a threshold. In one aspect, the threshold may be associated with a maximum power rating, as described herein. In another aspect, the threshold may be based on a predefined SNR. In response to the masking threshold magnitude (of one or more frequency bands) being higher than (or exceeding) the magnitude of the same frequency bands of the audio signal by the threshold, the rendering processor may apply a gain upon the audio signal to reduce the magnitude of the same frequency bands of the audio signal. In other words, the rendering processor may attenuate low-frequency spectral content of the audio signal so as to reduce (or eliminate) output of that spectral content by the speaker drivers since the low-frequency spectral content of the masking threshold is too high for the rendering processor to overcome the ambient noise. For instance, the rendering processor may apply a (first) gain upon the audio signal to reduce the magnitude of the low-frequency spectral content. Thus, by attenuating the spectral content that cannot overcome the ambient noise, the output device may preserve power and prevent distortion.

In response to the magnitude of the masking threshold being less than (or not exceeding) the magnitude of the same frequency band(s) of the audio signal by the threshold, the rendering processor may apply a (second) gain upon the audio signal to increase the magnitude. Continuing with the previous example, the rendering processor may boost low-frequency content of the audio signal, above the masking threshold to overcome the ambient noise. In one aspect, in response to the audio signal being above the masking threshold, the rendering processor may not apply a gain (e.g., across the frequency band).

Figure 7:
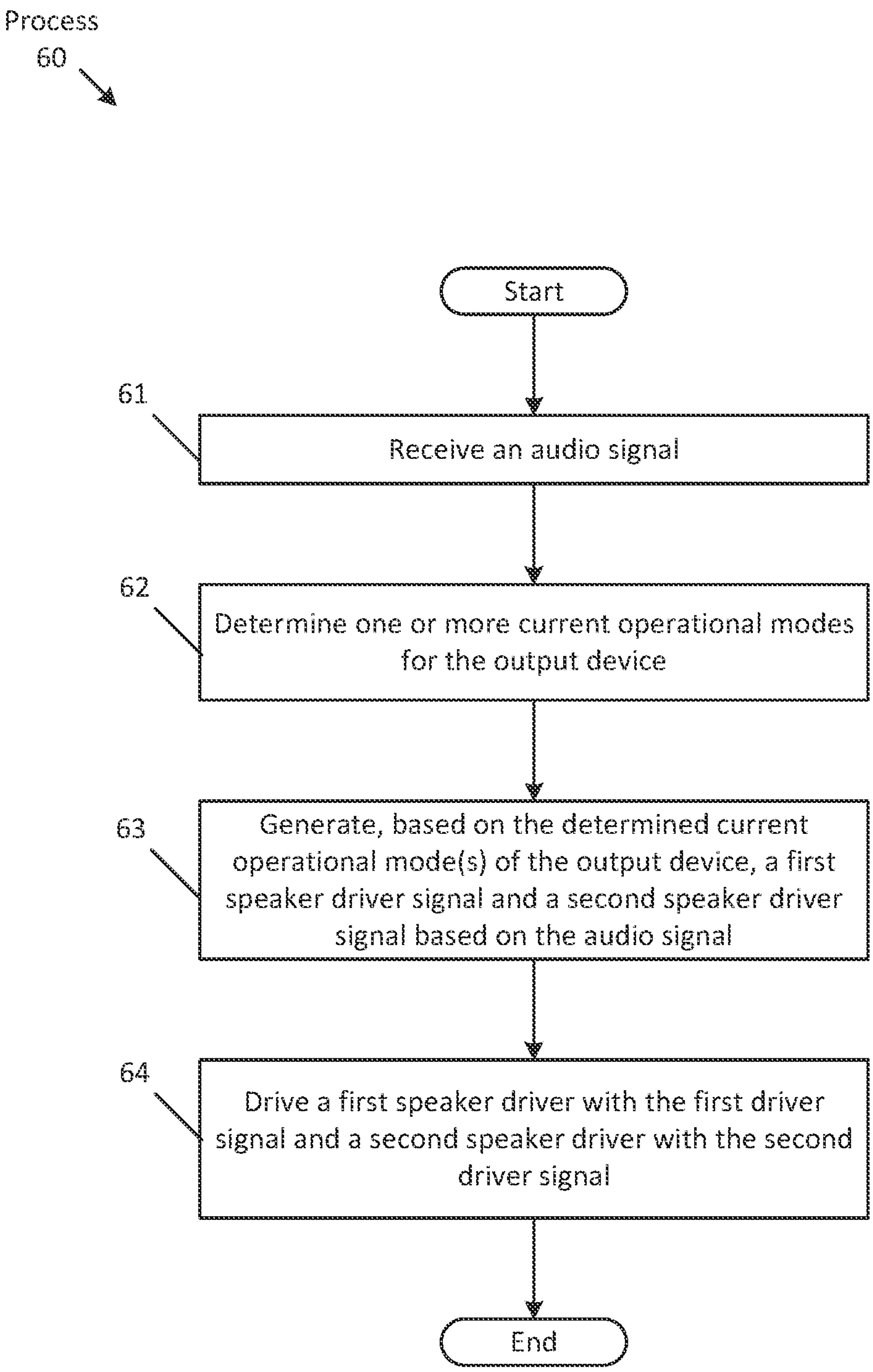
FIG. 7 is a flowchart of one aspect of a process to determine which of the two operational modes the system is to operate according to one aspect.

FIG. 7 is a flowchart of one aspect of a process to determine which of the two operational modes the system device is to operate according to one aspect. In one aspect, the process 60 is performed by the controller 51 of the (e.g., source device 2 and/or output device 3 of the) system 1.

The process 60 begins by the controller 51 receiving an audio signal (at block 61). Specifically, the controller 51 may obtain the audio signal from an audio source (e.g., from internal memory or a remote device). In one aspect, the audio signal may include user-desired audio content, such as a musical composition, a movie soundtrack, etc. In another aspect, the audio signal may include other types of audio, such as a downlink audio signal of a phone call that includes sound of the phone call (e.g., speech). The controller determines one or more current operational modes for the output device (at block 62). Specifically, the controller determines one or more operational modes for which the output device is to operate, such as the public mode, the private mode, or a combination thereof, as described herein. For instance, the controller 51 may determine whether a person is within a threshold distance of the output device. In another aspect, the controller may determine the one or more modes to operate based on whether ambient noise within the environment. For example, the controller may determine whether the (e.g., spectral content of the) ambient noise masks (e.g., has a magnitude that may be greater than spectral content of) the audio signal across one or more frequency bands. In response to the ambient noise masking a first set of frequency bands (e.g., low-frequency bands), the controller may select the public operational mode for those bands and/or, in response to the ambient noise not masking (or not masking above a threshold) a second set of frequency bands (e.g., high-frequency bands), the controller may also select the private operational mode for these bands. In one aspect, the controller may select one operational mode. In another aspect, the controller may select both operational modes, based on whether portions of the ambient noise masks and does not mask corresponding portions of the audio signal. For instance, when the first and second frequency bands are non-overlapping bands (or at least do not overlap beyond a threshold frequency range), the controller may select both modes such that the output device may operate in both public and private modes simultaneously.

The controller 51 generates, based on the determined (one or more) current operational mode(s) of the output device, a first speaker driver signal and a second speaker driver signal based on the audio signal (at block 63). Specifically, the controller generates the first and second driver signals based on the audio signal, where the current operational mode corresponds to whether at least portions of the first and second driver signals are generated to be at least one of in-phase and out-of-phase with each other. For example, If the output device is to operate in the public mode, the controller processes the audio signal to generate a first driver signal and a second driver signal, where both driver signals are in-phase with each other. For instance, in response to determining that a person is not within the threshold distance of the output device, the first and second speaker drivers may be generated to be in-phase with each other. In one aspect, the rendering processor 53 may use the (e.g., original) audio signal as the driver signals. In another aspect, the rendering processor may perform any audio signal processing operations upon the audio signal (e.g., equalization operations), while still maintaining phase between the two driver signals. In some aspects, at least some portions of the first and second driver signals may be generated to be in-phase across (e.g., the first set of) frequency bands for which the output device is to operate in public mode.

If, however, the output device is to operate in the private mode, the controller 51 processes the audio signal to generate the first driver signal and the second driver signal, where both driver signals are not in-phase with each other. For example, portions of the first and second driver signals may be generated to be out-of-phase across (e.g., the second set of) frequency bands for which the output device is to operate in private mode. Thus, the output device may operate in both operational modes simultaneously when the first and second driver signals are generated to be in-phase across some frequency bands, and out-of-phase across other frequency bands. In one aspect, when operating is private mode, the controller may be configured to only process portions of the driver signals that correspond to portions of the audio signal that are not masked by the ambient noise to be out-of-phase, while a remainder of portions (e.g., across other frequency bands) are not processed (e.g., where the phase of those portions are not adjusted). The controller drives the first speaker driver with the first driver signal and drives a second speaker driver with the second driver signal (at block 64).

Some aspects may perform variations to the process 60 described FIG. 7. For example, the specific operations of at least some of the processes may not be performed in the exact order shown and described. The specific operations may not be performed in one continuous series of operations and different specific operations may be performed in different aspects. In one aspect, although illustrated as selecting one of two operational modes, the controller may select both modes such that the output device operations in (at least) both modes simultaneously, as described herein. For instance, when determining which operational mode to select, the controller may determine whether ambient noise will mask at least a portion of the audio signal. In response to determining that the ambient noise will mask a portion (of spectral content) of the audio signal, the controller may select the public mode to process the audio signal such that a corresponding portion of the driver signals are in-phase, whereas, in response to determining that the ambient noise will not mask another portion of the audio signal, the controller may select the private mode to process the audio signal such that a corresponding portion of the driver signals are at least partially out-of-phase, as described herein.

In some aspects, the controller 51 may continuously (or periodically) perform at least some of the operations in process 60, while outputting an audio signal. For instance, the controller may determine that the output device is to operate in the private mode based on upon detecting a person within a threshold distance. Upon determining, however, that the person is no longer within the threshold distance (e.g., the person has moved away), the controller 51 may switch to the public mode. As another example, the controller may switch between both modes based on operating parameters. Specifically, in some instances, the controller may switch from private mode to public mode regardless of whether it is determined that the output device is to be in this mode based on operating parameters. For instance, upon determining that a battery level is below a threshold, the controller 51 may switch from private mode to public mode in order to ensure that audio output is maintained.

As described herein, the system 1 may operate in one or more operational modes, one being a non-private (or public) mode in which the system may produce sound that is heard by the user (e.g., intended listener) of the system and by one or more third-party listeners (e.g., eavesdroppers), while another being a private mode in which the system may produce a sound that is heard only by (or mostly by) the intended listener, while others may not perceive (or hear) the sound. To operate in the private mode, the system may drive two or more speaker drivers out-of-phase (or not in-phase), such that sound waves produced by the drivers may destructively interfere with one another, such that third-party listeners (e.g., who are at or beyond a threshold distance from the speaker drivers) may not perceive the sound, while the intended listener may still hear the sound. In another aspect, the system may mask private content (or sound only intended for the intended listener), by producing one or more beam patterns that are directed away from the intended listener (e.g., and towards third-part listeners) that include noise in order to mask the private content. As a result, audio content (e.g., such as speech of a phone call) may be directed (or transmitted) to one region in space (e.g., towards the intended listener), while the audio content is masked in one or more other regions in space such that people within these other regions may (e.g., only or primarily) perceive the noise. More about using noise beam patterns is described herein.

Figure 8:
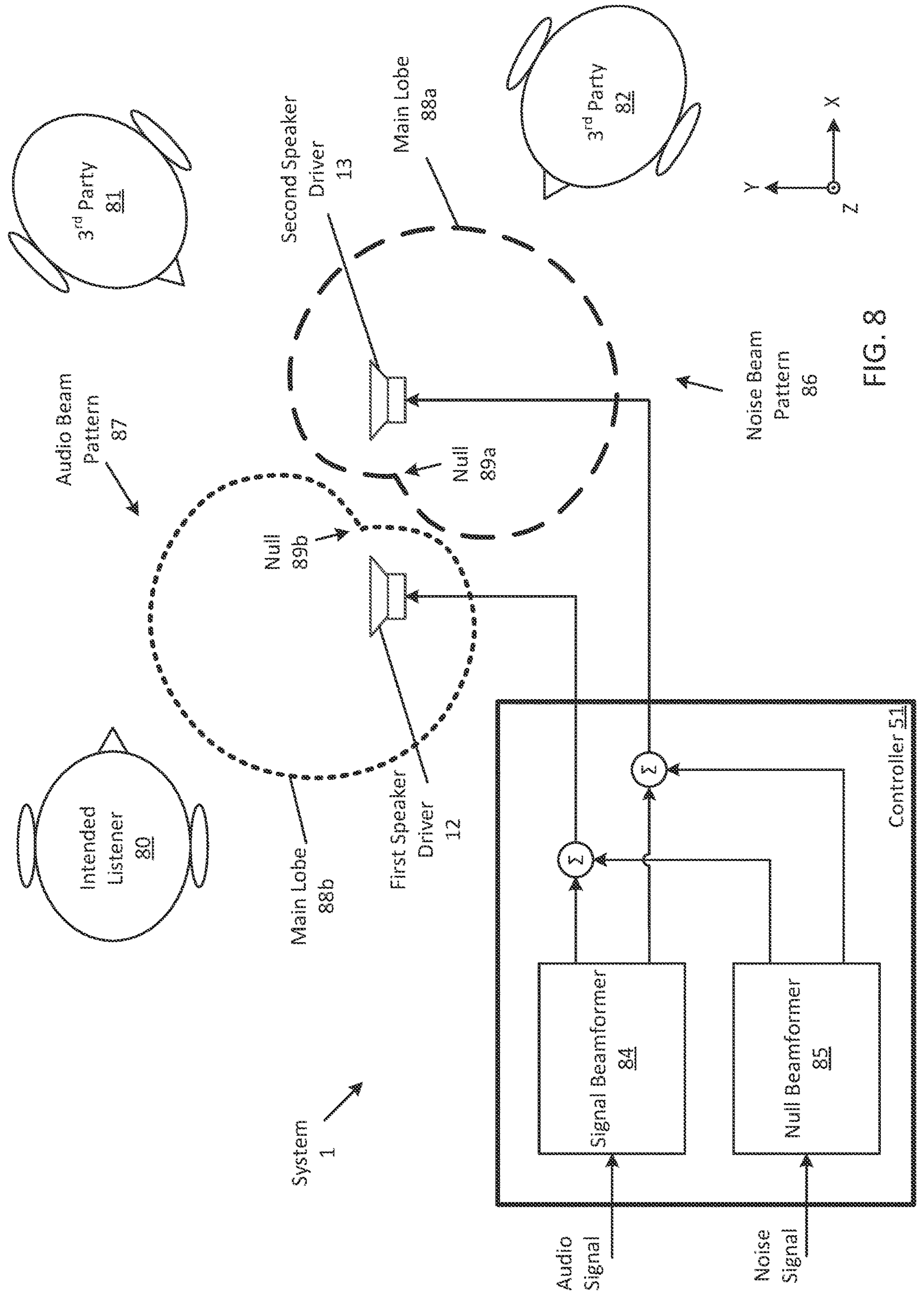
FIG. 8 shows the system with two or more speaker drivers for producing a noise beam pattern to mask audio content perceived by an intended listener according to one aspect.

FIG. 8 shows the system 1 with two or more speaker drivers for producing a noise beam pattern to mask audio content perceived by an intended listener according to one aspect. This figure shows the system 1 that includes (at least) the controller 51 and speaker drivers 12 and 13. As described herein, the system may be a part of the output device 3, such that the controller and the speaker driver are integrated into a housing of the output device. In another aspect, the speaker drivers may be a part of the output device, while the controller may be a part of a source device that is communicatively coupled with the output device. Further, as shown, the system is producing, using the speaker drivers, a noise (directional) beam pattern 86 and an audio (directional) beam pattern 87. In one aspect, the system may produce more or less beam patterns, where each beam pattern may be directed towards different locations within an ambient environment in which the system is located and includes similar (or different) audio content. More about these beam patterns is described herein.

The controller 51 includes a signal beamformer 84 and a null (or notch) beamformer 85, each of which is configured to produce one or more (e.g., directional) beam patterns, such the speaker drivers. In one aspect, the controller may include other operational blocks, such as the blocks illustrated in FIG. 6. In which case, the beamformers may be a part of the rendering processor 53.

In some aspects, the null beamformer 85 receives one or more (audio) noise signals (e.g., a first audio signal), which may include any type of noise (e.g., white noise, brown noise, pink noise, etc.). In another aspect, the noise signal may include any type of audio content. In one aspect, the noise signal may be generated by the system (e.g., by the ambient masking estimator 54 of the controller 51). In which case, the noise signal may be generated based on the ambient sound (or noise) within the ambient environment in which the system is located. Specifically, the masking estimator may define spectral content of the noise signal based on the magnitude of spectral content contained within the microphone signal produced by the microphone 55. For instance, the estimator may apply one or more scalar gains (or vector gains) upon the microphone signal such that the magnitude of one or more frequency bands of the signal exceeds a (e.g., predefined) threshold. In another aspect, the estimator may generate the noise signal based on the audio signal and/or the ambient noise within the environment. Specifically, the estimator may generate the noise signal such that noise sound produced by the system masks the sound of the user-desired audio content produced by the system (e.g., at a threshold distance from the system). The noise beamformer produces (or generates) one or more individual driver signals for one or more speaker drivers so as to "render" audio content of the one or more noise signals as one or more noise (directional) beam patterns produced (or emitted) by the drivers.

In one aspect, the signal beamformer receives one or more audio signals (e.g., a second audio signal), which may include user-desired audio content, such as speech (e.g., sound of a phone call) music, a podcast, a movie sound track, in any audio format (e.g., stereo format, 5.1 surround sound format, etc.). In one aspect, the audio signal may be received (or retrieved) from local memory (e.g., memory of the controller). In another aspect, the audio signal may be received from a remote source (e.g., streamed over a computer network from a separate electronic device, such as a server). The signal beamformer may perform similar operations as the noise beamformer, such as producing one or more individual driver signals so as to render the audio content as one or more desired audio (directional) beam patterns.

Each of the beamformers produces a driver signal for each speaker driver, where driver signals for each speaker driver are summed by the controller 51. The controller uses the summed driver signals to drive the speaker drivers to produce a noise beam pattern 86 that (e.g., primarily) includes noise from the noise signal and to produce an audio beam pattern 87 that (e.g., primarily) includes the audio content from the audio signal. This figure is also showing a top-down view (e.g., in the XY-plane) of the system producing the beam patterns 86 and 87 that are directed to (or away) several listeners 80-82. Specifically, a main lobe 88*b* of the audio beam pattern 87 is directed towards the intended listener 80 (e.g., the user of the system), whereas a null 89*b* of the pattern is directed away from the intended listener (e.g., and towards at least the third-party listener 82). In addition, a main lobe 88*a* of the noise beam pattern 86 is directed towards the third party listeners 81 and 82 (and away from the intended listener 80), while a null 89*a* of the pattern is directed towards the intended listener. As a result, the intended listener will experience less (or no) noise sound of the noise beam pattern, while experiencing the audio content contained within the audio beam pattern. Conversely, the third-party listeners will only (or primarily) experience the noise sound of the noise bema pattern 86.

In one aspect, the beamformers may be configured to shape and steer their respective produced beam patterns based the position of the intended listener 80 and/or the position of the (one or more) third-part listeners 81 and 82. Specifically, the system may determine whether a person is detected within the ambient environment, and in response determine the location of that person with respect to a reference point (e.g., a position of the system). For example, the system may make these determinations based on sensor data (e.g., image data), as described herein. Once the intended listener's position is determined, the signal beamformer 84 may steer (e.g., by applying one or more vector weights upon the audio signal to produce) the audio beam pattern 87, such that it is directed towards the intended listener. Similarly, locations of one or more third-party listeners is determined, the null beamformer 85 directs the noise beam pattern 86 accordingly. In one aspect, when several third-party listeners are detected, the null beamformer 85 may direct the noise beam pattern such that an optimal amount of noise is directed towards all of the listeners. In another aspect, the null beamformer may steer the noise pattern taking into account the location of the intended listener (e.g., such that a null is always directed towards the intended listener).

In one aspect, the beamformers 84 and 85 may perform any type of (e.g., adaptive) beamformer algorithm to produce the one or more driver signals. For instance, either of the beamformers may perform phase-shifting beamformer operations, minimum-variance distortionless-response (MVDR) beamformer operations, and/or linear-constraint minimum-variance (LCMV) beamformer operations.

Figure 9:
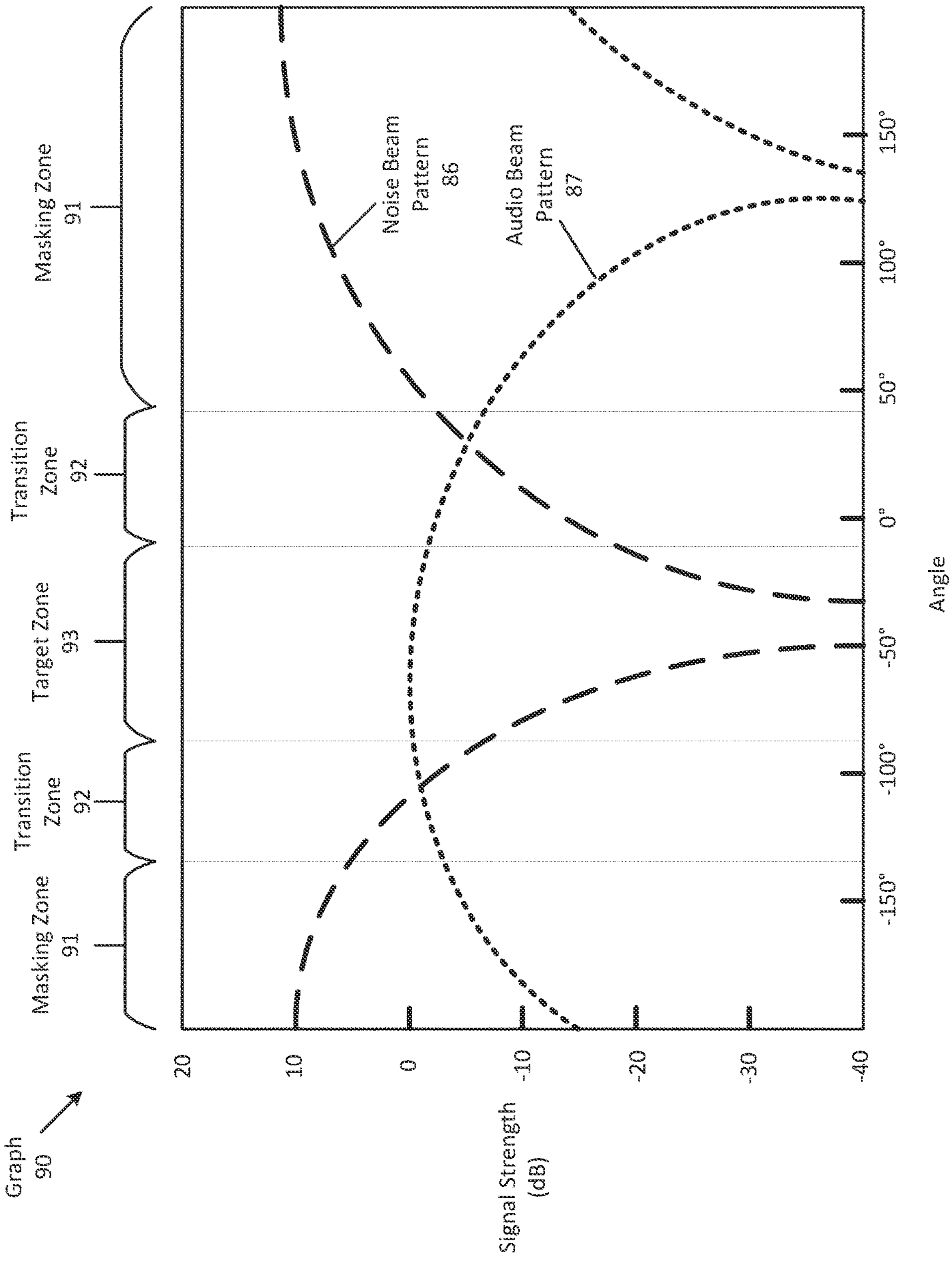
FIG. 9 shows a graph of signal strength of audio content and noise with respect to one or more zones about the output device according to some aspects.

In one aspect, the beam patterns 86 and 87 produced by the system may create different regions or zones within the ambient environment that have differing (or similar) signal-to-noise ratios (SNRs). For instance, the intended listener 80 may be located within a region that has a first SNR, while the third party listener 81 and 82 may be located within a region (or regions) that have a second SNR that is lower than the first SNR. As a result, the user-desired audio content of the audio beam pattern 87 may be more intelligible by the intended listener than the third-part listeners who cannot hear the audio content due to the masking features of the noise. To illustrate, FIG. 9 shows a graph 90 of signal strength of audio content and noise with respect to one or more zones about the system according to some aspects.

Specifically, the graph 90 shows the sound output level as signal strength (e.g., in dB) of the noise beam pattern 86 and the audio beam pattern 87 with respect to angles about an axis (e.g., a Z-axis) that runs through the system. In one aspect, the axis may be a center Z-axis of an area (or a portion of the system) that includes the speaker drivers. For instance, as shown in FIG. 8, the center axis may be positioned between both the first and second speaker drivers.

As shown in the graph 90, the beam patterns produced by the system create several zones (e.g., about the center Z-axis). In particular, the graph shows three types of zones, a masking zone 91, a transition zone 92, and a target zone 93. In one aspect, each zone may have a different SNR. For instance, the masking zone 91 is a zone about the system, where the SNR is below a (e.g., first) threshold. In one aspect, this zone is a masking zone such that while positioned in this zone, the noise sound produced by the system masks the user-desired audio content such that listener within this zone may be unable to perceive (or understand) the user-desired audio content. In some aspects, the third-party listeners 81 and 82 in FIG. 8 may be positioned within this masking zone.

The target zone 93 is a zone about the system, where the SNR is above a (e.g., second) threshold. In one aspect, the second threshold may be greater than the first threshold. In another aspect, both thresholds may be the same. In some aspects, this zone is a target zone such that while a listener is positioned within this zone, the audio content of the audio beam pattern 87 is intelligible and is not drowned out (or masked) by the noise sound. In some aspects, the intended listener 80 may be positioned within this zone. The graph also shows a transition zone 92, which is on either size of the target zone, separating the target zone from the masking zone 91. In one aspect, the transition zone may have a SNR that transitions from the first threshold to the second threshold. Thus, the SNR of this zone may be between both thresholds. In one aspect, the system may shape and steer the beam patterns in order to minimize the transition zone 92.

Figure 10:
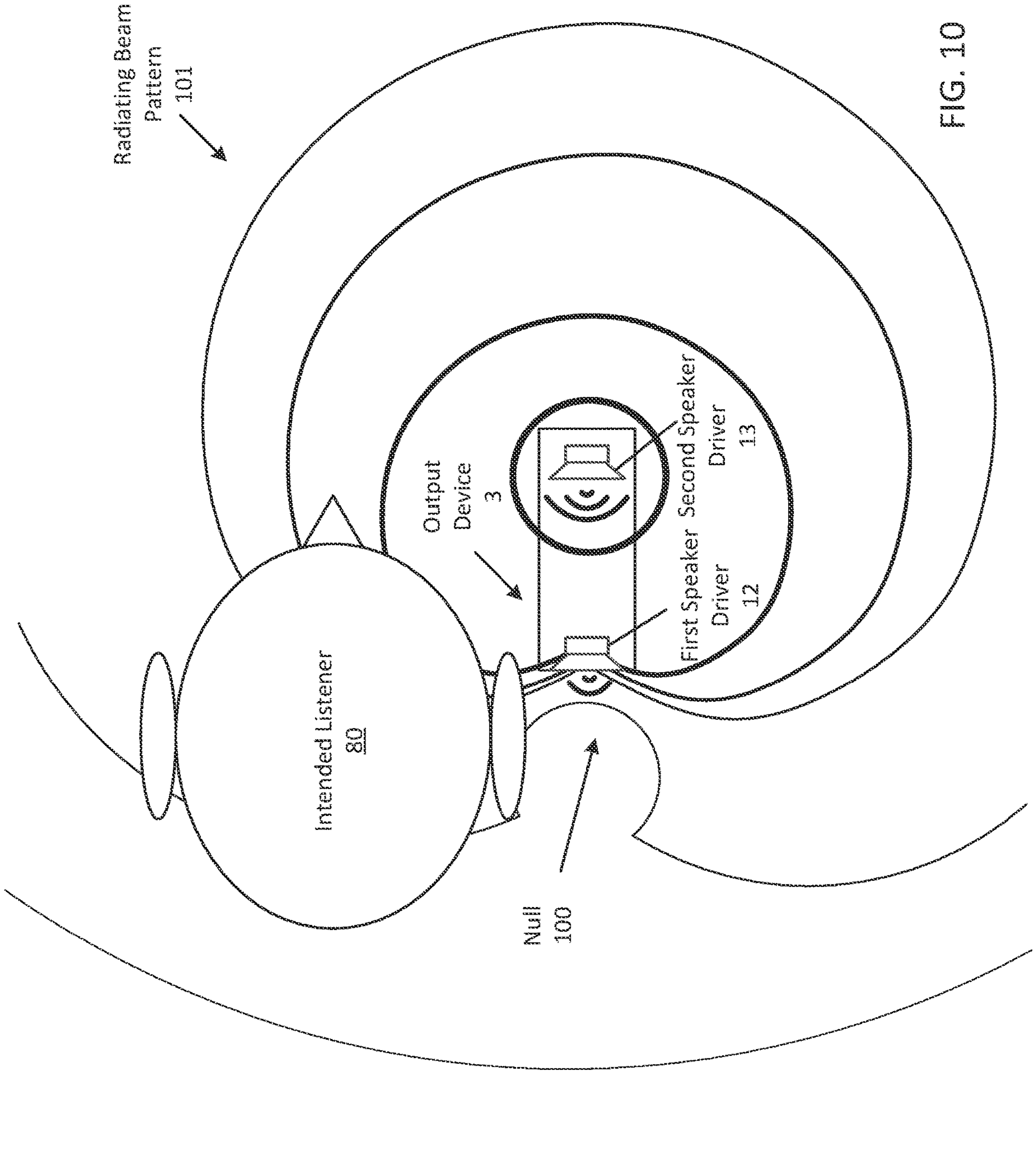
FIG. 10 shows a radiating beam pattern that has a null at the intended listener's ear according to some aspects.
Figure 11:
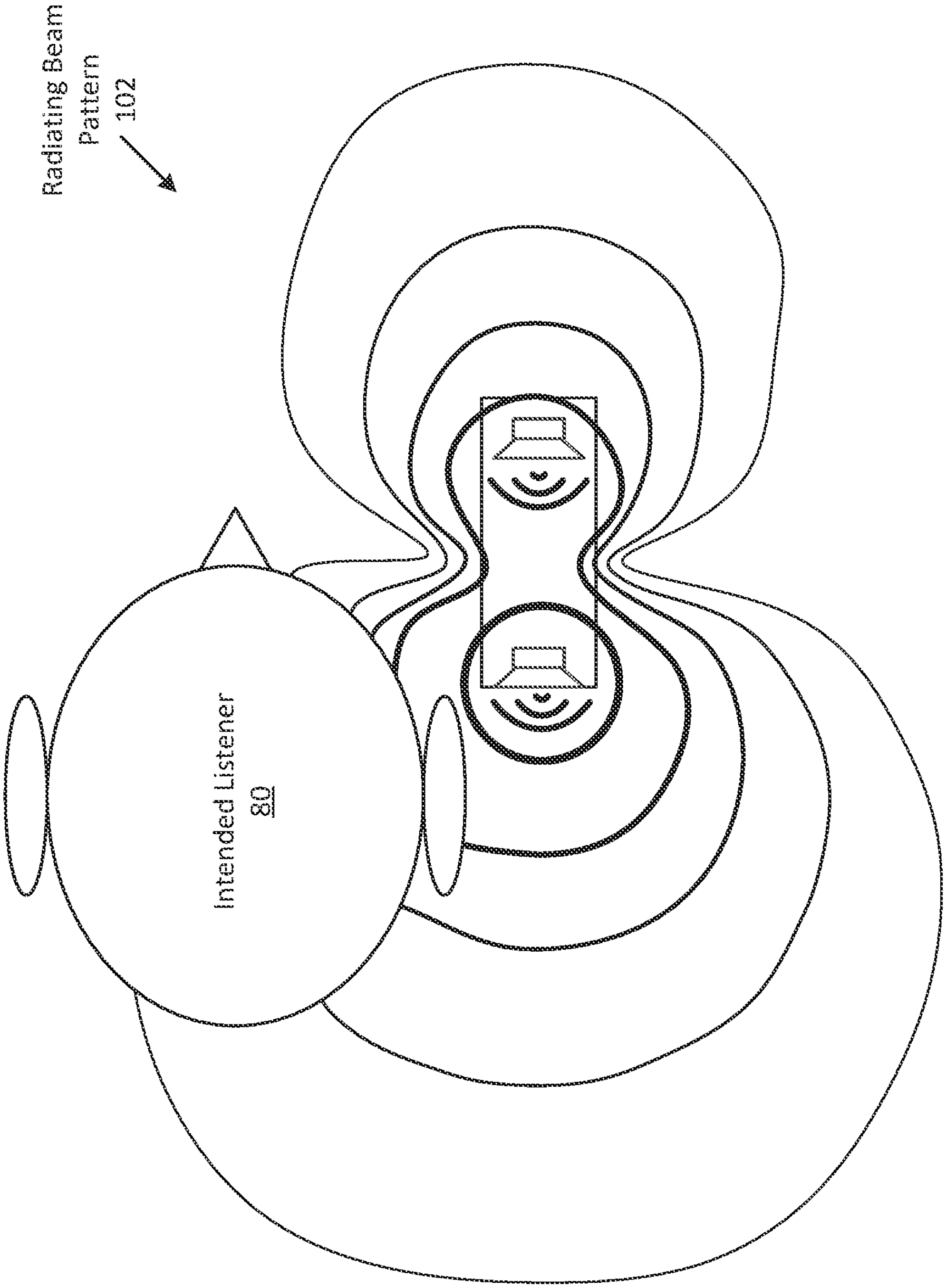
FIG. 11 shows another radiating beam pattern that directs sound at the ear of the intended listener according to one aspect.

As described thus far, the system, or more specifically the output device 3 that includes the speaker drivers may produce several beam patterns, which may be directed towards different locations within the ambient environment to create different zones in order to provide an intended listener privacy. In one aspect, the output device may be positioned anywhere within the ambient environment. For instance, the output device may be a standalone electronic device, such as a smart speaker. In another aspect, the output device may be a head-worn device, such as a pair of smart glass or a pair of headphones. In which case, when the output device is a head-worn device, the zones may be optimized based on the position (and/or orientation) of one or more speaker drivers of the device in order to maximize audio privacy for the intended listener. FIGS. 10 and 11 show examples of beam patterns produced by the output device, while the intended listener is very close to the device's speaker drivers.

For example, FIG. 10 shows a top-down view of a radiating beam pattern 101 that has a null 100 at the intended listener's ear according to some aspects. By placing the null 100 close to the intended listener's ear, while the beam pattern radiates out and away from the intended listener, allows radiating sound (e.g., noise) to spread out within the environment while not being heard (or at least not heard above a sound output level threshold) by the intended listener.

As shown, the output device is positioned close to the intended listener 80. For example, the output device may be within a threshold distance of the listener. In particular, the output device may be within a threshold distance of to an ear (e.g., the right ear) of the listener. In addition, one or more of the output device's speaker drivers may be closer to the intended listener than one or more other speaker drivers. As shown, the first speaker driver 12 is closer (e.g., within a threshold distance) to the (e.g., right) ear of the listener, whereas the second speaker driver 13 is further away (e.g., outside the threshold distance) from the right ear. In one aspect, the speaker drivers may be positioned accordingly when the output device is in use by the intended listener. In particular, the first speaker driver may be closer to the ear of the user than the second speaker driver while the (e.g., head-worn) output device is worn on a head of the user.

In another aspect, along with (or in lieu of) being close to the intended listener, the speaker drivers may be orientated such that they project sound towards the intended listener. Specifically, as shown, the first and second speaker drivers are arranged to project front-radiate sound towards or in a direction of the ear of the user. In one aspect, both (or all) of the speaker drivers of the output device may be arranged to project sound in a same direction. In another aspect, at least one of the speaker drivers may be arranged to project sound differently. For instance, the second speaker driver may be orientated to project sound at a different angle (e.g., about a center Z-axis) than the angle at which the first speaker driver projects sound.

As shown in this figure, the first and second speaker drivers 12 and 13 are producing a directional beam pattern 101 that is radiating away from the intended listener (e.g., and to all other locations within the ambient environment), as shown by the boldness of the beam pattern becoming lighter as it moves away from the output device. Such a beam pattern may include masking noise, as described herein. The beam pattern 101 includes the null 100 that is a position in space at which there is no (or very little, below a threshold) sound of the beam pattern 101. In one aspect, this null may be produced based on the sound output of the first and second speaker drivers. For instance, to create the null, the output device may drive the first speaker driver 12 with a first driver signal having a first signal level, while driving the second speaker driver 13 with a second driver signal having a second signal level that is higher than the first signal level. In one aspect, the first driver signal may be (e.g., at least partially) out-of-phase with respect to the second driver signal. As a result, the first speaker driver 12 may produce sound to cancel the masking noise produced by the second speaker driver 13, where a sound output level of the second driver is greater than a sound output level of the first speaker driver. The differences in sound output level is illustrated by only two curved lines positioned in front of the first speaker driver illustrating sound output, whereas there are three lines radiating from the second speaker driver 13. As a result of the reduced sound output by the first speaker drive of the canceling sound, the intended listener experiences less masking noise.

In one aspect, the radiating beam pattern 101 may include user-desired audio content along with the masking noise. For instance, the controller 51 may receive an audio signal and a noise signal, as described herein. The controller may process the audio signals to produce a first driver signal to drive the first speaker driver and a second driver signal to drive the second driver signal. In one aspect, the first driver signal may include more spectral content of the user-desired audio content than the second driver signal. For example, the second driver signal may not include any spectral content of the user-desired audio content. In which case, when the signals are used to drive their respective speaker drivers, the sound output of the first speaker driver cancels the masking noise produced by the second speaker driver and produces sound of the user-desired audio content. In which case, the intended listener may hear the user-desired audio content, sound of the content is masked by the masking noise produced by the second speaker driver.

FIG. 11 shows another radiating beam pattern 102 that directs sound at the ear of the intended listener according to one aspect. In this example, the radiating beam pattern 102 may maximize the SNR at the listener's ear, while minimizing the SNR beyond a threshold distance from the (e.g., ear of the) listener. This is shown by the boldness of the radiating beam pattern becoming lighter as it radiates away from the intended listener. In this example, both speaker drivers may produce the radiating beam pattern, where both speaker drivers are driven with driver signals that are in-phase, as described herein. In one aspect, both speaker drivers may output sound having a same (or different) sound output level.

In one aspect, the beam patterns described herein may be individually produced by the output device, as illustrated in FIGS. 10 and 11. In another aspect, multiple beam patterns may be produced. For example, the output device may produce both radiating beam patterns 101 and 102. In which case, the beam pattern 101 may radiate masking noise, while the beam pattern 102 includes the user-desired audio content. As a result, the sound of the user-desired audio content may be directed at the user's ear, while it is masked from others within the vicinity of the intended listener.

Another aspect of the disclosure is a method performed by (e.g., a programmed processor of) a dual-speaker system that includes a first speaker driver and a second speaker driver. The system receives an audio signal containing user-desired audio content (e.g., a musical composition). The system determines that the dual-speaker system is to operate in one of a first ("non-private") operational mode or a second ("private") operational mode. The system processes the audio signal to produce a first driver signal to drive the first speaker driver and a second driver signal to drive the second speaker driver. In the first mode both signals are in-phrase with each other. In the second mode, however, both signals are not in-phase with each other. For example, both signals may be out-of-phase by 180° (or less). In one aspect, the system drives the speaker drivers with the respective driver signals, which are not in-phase, to produce a beam pattern having a main lobe in a direction of a user of the dual-speaker system. In some aspects, the produced beam pattern may have at least one null directed away from the user of the output device. For instance, the null may be directed towards another person within the environment.

In one aspect, both speaker drivers are integrated within a housing, where determining includes determining whether a person is within a threshold distance of the housing, in response to determining that the person is within the threshold distance, selecting the second operational mode, and, in response to determining that the person is not within the threshold distance, selecting the first operational mode. In one aspect, determining whether a person is within the threshold distance includes receiving image data from a camera and performing an image recognition algorithm upon the image data to detect a person therein.

In some aspects, the system further receives a microphone signal produced by a microphone that is arranged to sense ambient sound of the ambient environment, uses the microphone signal to determine a noise level of the ambient sound, and increases a sound output level of the first and second speaker drivers to exceed the noise level. In one aspect, the system determines, for each of several frequency bands of the audio signal, whether a magnitude of a corresponding frequency band of the ambient sound exceeds a magnitude of the frequency band by a threshold, where increasing includes, in response to the magnitude of the corresponding frequency band exceeding the magnitude of the frequency band by the threshold, applying a first gain upon the audio signal to reduce the magnitude of the frequency band and, in response to the magnitude of the corresponding frequency band not exceeding the magnitude of the frequency band by the threshold, applying a second gain upon the audio signal to increase the magnitude of the frequency band.

In some aspects, both speaker drivers are integrated within a housing, wherein determining includes determining whether a person is within a threshold distance from the housing, in response to determining that the person is within the threshold distance, selecting the second operational mode, and, in response to determining that the person is not within the threshold distance, selecting the first operational mode. In some aspects, determining whether a person is within the threshold distance includes receiving image data from a camera (e.g., which may be integrated within the housing, or may be integrated within a separate device), and performing an image recognition algorithm upon the image data to detect a person contained therein.

In one aspect, the method further includes driving, while in the second operational mode, the first and second speaker drivers with the first and second driver signals, respectively, to output the audio signal in a beam pattern having a main lobe in a direction of a user of the system. In another aspect, the main lobe may be directed in other directions (e.g., in a direction that is away from the user).

In some aspects, the method further includes receiving a microphone signal produced by a microphone that is arranged to sense ambient sound of the ambient environment, using the microphone signal to determine a noise level of the ambient sound, and increasing a sound output level of the first and second speaker drivers to exceed the noise level. In another aspect, the method further includes determining, for each of several frequency bands of the audio signal, whether a magnitude of a corresponding frequency band of the ambient sound exceeds a magnitude of the frequency band by a threshold, wherein increasing includes, in response to the magnitude of the corresponding frequency band exceeding the magnitude of the frequency band by the threshold, applying a first gain (or an attenuation) upon the audio signal to reduce the magnitude of the frequency band, and, in response to the magnitude of the corresponding frequency band not exceeding the magnitude of the frequency band by the threshold, applying a second gain upon the audio signal to increase the magnitude of the frequency band.

In another aspect, while in the second operational mode (at least a portion of) the first driver signal and (at least a portion of) the second driver signal are out-of-phase by (at least) 180°. In some aspects, the first and second speaker drivers are integrated within a head-worn device.

Personal information that is to be used should follow practices and privacy policies that are normally recognized as meeting (and/or exceeding) governmental and/or industry requirements to maintain privacy of users. For instance, any information should be managed so as to reduce risks of unauthorized or unintentional access or use, and the users should be informed clearly of the nature of any authorized use.

As previously explained, an aspect of the disclosure may be a non-transitory machine-readable medium (such as microelectronic memory) having stored thereon instructions, which program one or more data processing components (generically referred to here as a "processor") to perform the network operations and audio signal processing operations, as described herein. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A head-worn device comprising:

a housing;

an elongated tube coupled to the housing;

a first speaker driver that is integrated within the housing at a first location and is arranged to project sound into an ambient environment; and a second speaker driver that is integrated within the housing at a second location that is different than the first location and is arranged to project sound into the ambient environment, wherein a front face of the first speaker driver is directed towards a first direction and a front face of the second speaker driver is directed towards a second direction, wherein the first direction and the second direction are opposite directions along a same axis, wherein the first and second speaker drivers share a common back volume within the housing and the elongated tube opens the common back volume into the ambient environment.

2. The head-worn device of claim 1, wherein the housing forms an open enclosure that is outside of the common back volume and surrounds the front face of the second speaker driver.

3. The head-worn device of claim 2, wherein the open enclosure is open to the ambient environment through a plurality of ports through which the second speaker driver projects front-radiated sound into the ambient environment.

4. The head-worn device of claim 1, wherein the elongated tube comprises a first open end that is coupled to the housing and a second open end that comprises an exhaust port through which back-radiated sound produced by the first speaker driver or the second speaker driver is expelled into the ambient environment.

5. The head-worn device of claim 1, wherein the first speaker driver is a same type of speaker driver as the second speaker driver.

6. The head-worn device of claim 1, wherein the first speaker driver is a different type of speaker as the second speaker driver.

7. An output device comprising:

a housing that includes an internal volume;

a first extra-aural speaker driver and a second extra-aural speaker driver, both extra-aural speaker drivers integrated within the housing and share the internal volume as a back volume;

a processor; and memory having instructions stored therein which when executed by the processor causes the output device to:

receive an audio signal;

determine a current operational mode for the output device;

generate first and second driver signals based on the audio signal, wherein the current operational mode corresponds to whether at least portions of the first and second driver signals are generated to be at least one of in-phase or out-of-phase with each other;

drive the first extra-aural speaker driver with the first driver signal; and drive the second extra-aural speaker driver with the second driver signal.

8. The output device of claim 7, wherein the instructions to determine the current operational mode comprises instructions to determine whether a person is within a threshold distance of the output device, wherein, in response to determining that the person is within the threshold distance, the first and second driver signals are generated to be at least partially out-of-phase with each other.

9. The output device of claim 8, wherein, in response to determining that the person is not within the threshold distance, the first and the second driver signals are generated to be in-phase with each other.

10. The output device of claim 7, wherein the memory has further instructions to drive the first and second extra-aural speaker drivers with the first and second driver signals, respectively, comprises instructions to produce a beam pattern having a main lobe in a direction of a user of the output device.

11. The output device of claim 10, wherein the produced beam pattern has at least one null directed away from the user of the output device.

12. The output device of claim 7 further comprising receiving a microphone signal produced by a microphone of the output device that includes ambient noise of an ambient environment in which the output device is located, wherein the current operational mode is determined based on the ambient noise.

13. The output device of claim 12, wherein the instructions to determine the current operational mode for the output device comprises instructions to:

determine whether the ambient noise masks the audio signal across one or more frequency bands;

in response to the ambient noise masking a first set of frequency bands of the one or more frequency bands, select a first operational mode in which portions of the first and second driver signals are generated to be in-phase across the first set of frequency bands; and in response to the ambient noise not masking a second set of frequency bands of the one or more frequency bands, select a second operational mode in which portions of the first and second driver signals are generated to be out-of-phase across the second set of frequency bands.

14. The output device of claim 13, wherein the first and second sets of frequency bands are non-overlapping bands, such that the output device operates in both the first and second operational modes simultaneously.

15. A head-worn device comprising:

a first extra-aural speaker driver and a second extra-aural speaker driver, wherein the first extra-aural speaker driver is closer to an ear of a user than the second extra-aural speaker driver while the head-worn device is worn on a head of the user;

a processor; and memory having instructions stored therein which when executed by the processor causes the head-worn device to:

receive an audio signal that comprises noise; and produce, using the first and second extra-aural speaker drivers, a directional beam pattern that includes 1) a main lobe that has the noise and is directed away from the user and 2) a null that is directed towards the user, wherein a sound output level of the second extra-aural speaker driver is greater than a sound output level of the first extra-aural speaker driver.

16. The head-worn device of claim 15, wherein the main lobe is a first main lobe, and the null is a first null, wherein the audio signal is a first audio signal and the directional beam pattern is a first directional beam pattern, wherein the memory has further instructions to:

receive a second audio signal that comprises user-desired audio content; and produce, using the first and second extra-aural speaker drivers, a second directional beam pattern that includes 1) a second main lobe that has the user-desired audio content and is directed towards the user and 2) a second null that is directed away from the user.

17. The head-worn device of claim 15, wherein the first and second extra-aural speaker drivers project front-radiated sound towards or in a direction of the ear of the user.

* * * * *